(12) United States Patent
Kawata et al.

(10) Patent No.: US 6,997,019 B2
(45) Date of Patent: Feb. 14, 2006

(54) MOLDING PROCESS OF DISK WITH SHAFT SHAPED PORTION

(75) Inventors: Tatsumi Kawata, Kawasaki (JP); Kazuo Nimura, Kawasaki (JP); Kengo Kainuma, Kawasaki (JP); Kunio Hibino, Hirakata (JP); Hidenao Kataoka, Osaka (JP)

(73) Assignees: Fuji Electric Co., Ltd., Kanagawa (JP); Matsushita Electric Industrial Co., Ltd., Osaka (JP)

( * ) Notice: Subject to any disclaimer, the term of this patent is extended or adjusted under 35 U.S.C. 154(b) by 334 days.

(21) Appl. No.: 10/141,344

(22) Filed: May 9, 2002

(65) Prior Publication Data
US 2002/0184921 A1    Dec. 12, 2002

(30) Foreign Application Priority Data
May 9, 2001    (JP)    .............................. 2001-138879
Jun. 20, 2001    (JP)    .............................. 2001-187152

(51) Int. Cl.
*C03B 11/00*    (2006.01)
(52) U.S. Cl. .......................................... 65/102; 65/305
(58) Field of Classification Search ................. 65/102, 65/305, 323; 425/406, 411, 193, 195, 352; 264/319, 320, 334
See application file for complete search history.

(56) References Cited

U.S. PATENT DOCUMENTS

| | | | |
|---|---|---|---|
| 4,820,787 A * | 4/1989 | Kataoka et al. | ............. 526/255 |
| 4,883,528 A | 11/1989 | Carpenter et al. | |
| 5,788,732 A * | 8/1998 | Nomura et al. | ................ 65/64 |
| 5,987,922 A | 11/1999 | Hirota et al. | |
| 6,003,336 A * | 12/1999 | Kashiwagi et al. | .... 204/192.15 |
| 6,009,728 A * | 1/2000 | Kashiwagi et al. | ...... 65/374.11 |

FOREIGN PATENT DOCUMENTS

| | | | |
|---|---|---|---|
| JP | 62230469 A | * | 10/1987 |
| JP | 02137914 | | 5/1990 |
| JP | 2003146672 A | * | 5/2003 |
| JP | 2004091296 A | * | 3/2004 |
| JP | 2004131315 A | * | 4/2004 |
| WO | WO 01/50464 A1 | | 7/2001 |

OTHER PUBLICATIONS

Derwent Abstract Accession No. 2004-272418/26, JP 2003054964 A (Fuji Electric Co Ltd et al) Feb. 26, 2003.
Patent Abstracts of Japan, JP, 2002187727 A (Matsushita Electrict Co Ltd et al) Jul. 5, 2002.
Derwent Abstract Accession No. 2000-266374/23, JP 2000072545 A (Hoya Corp) Mar. 7, 2000.

* cited by examiner

*Primary Examiner*—Dionne A. Walls
*Assistant Examiner*—Carlos Lopez
(74) *Attorney, Agent, or Firm*—Venable LLP; Michael A. Sartori; Catherine M. Voorhees

(57) ABSTRACT

A press die and a molding process can form a disk member having a shaft shaped portion at a center with satisfactory circularity and flatness in a disk portion, dimensional precision in the shaft shaped portion, and concentricity between the disk portion and the shaft shaped portion at the center. The press die is designed for press molding of a glass substrate of a disk member with a shaft shaped portion at a center thereof. The press die includes an upper die forming an upper surface of the disk member, an intermediate die having a shaft forming hole portion for forming a shaft shaped portion projecting from a disk portion of the disk member, a lower die for forming a lower surface of the shaft shaped portion and a guide member for guiding the upper die, the intermediate die and the lower die.

6 Claims, 34 Drawing Sheets

MOLDING PROCESS OF DISK WITH SHAFT SHAPED PORTION

This application is based on Japanese Patent Application Nos. 2001-138879 filed May 9, 2001 and 2001-187152 filed Jun. 20, 2001, the contents of which are incorporated hereinto by reference.

BACKGROUND OF THE INVENTION

1. Field of the Invention

The present invention relates generally to a press die and a molding process of a disk with shaft shaped portion for press molding a glass substrate of a disk formed from a disk member having a shaft shaped portion at a center, such as an optical disk, a magnetic disk and so forth.

2. Description of the Related Art

In the recent years, demand for higher performance of a disk drive unit as external memory device, such as down-sizing, higher capacity and so on, has been growing significantly with the spread of computers. Associating with this, lowering of floating height of a magnetic head has been aggressively studied to require quite high precision for flatness of the magnetic disk.

Conventionally, as a material of substrate for a magnetic disk, aluminum alloy is mainly employed. However, in case of aluminum alloy substrate, a polished surface may cause plastic deformation even when high precision polishing is provided by high precision abrasive forming and polishing device due to low hardness. Therefore, it is difficulty to obtain the flat surface on the aluminum alloy disk with satisfactorily high precision. Also, even when a nickel-phosphorous plating layer having higher hardness is formed on the surface of the substrate, it is still not possible to satisfy the demand for high precision.

On the other hand, movement for down-sizing requires thinning of a disk thickness. The aluminum alloy substrate having low strength is difficult to satisfy the demand in this viewpoint.

Employment of giant magnetoresistive head having high sensitivity in the recent years, requires reduction of noise of the magnetic disk. For this reason, the substrate is required to adapt for noise reduction process by heat treatment after formation of magnetic film. However, even in this viewpoint, it has been difficult for aluminum alloy to satisfy the demand.

For solving the foregoing problems, as the substrate for the magnetic disk, new materials, such as glasses, ceramics, carbon and so on have been proposed. Among these new materials, glass substrates have been widely studied and have already been put into practice. The glass substrates has high strength, high heat resistance, high surface hardness sufficient for satisfying demand for high precision flatness by precise polishing process.

Conventionally, the glass substrate for the magnetic disk has been produced by polishing method to effect precise polishing for each individual glass substrate in one by one basis for obtaining flat surface after cutting into a predetermined size. However, high precision is required in the polishing process and large number of process steps are required.

Therefore, as new fabrication process of the glass substrate for the magnetic disk, isothermal press molding process for perform press molding with equal temperature of die and glass material has been considered. Various studies have been made for the isothermal press molding process in the field of optical glass element fabrication. As a result, the isothermal press molding processes have already been put into practice as fabrication processes capable of fabrication of the glass substrates with high quality and high productivity.

The press die to be used for press molding has to be a special die which does not cause deterioration even by repeated molding of glass at high temperature and high pressure. Therefore, various studies have been made for the press dies.

As a matrix of press die for press molding, hard metal (tungsten carbide), cermet, zirconium, silicon carbide and other ceramics may be used. On the other hand, the die coated with a protective film having high mold releasing ability, oxidation resistance, reaction resistance has been developed for protection of the matrix and prevention of adhesion of glass upon mold release.

For example, Japanese Patent Application Laid-open No. 2-137914 (1990) proposes a die for molding a disk provided with a noble metal alloy thin film on a surface of hard metal. This process has been actively studied as fabrication process of the glass substrate for the magnetic disk corresponding to movement of recent high density recording.

On the other hand, recent demand for large recording capacity for the disk of a disk drive unit requires high precision of precision in rotation of the disk.

However, in the disk drive unit mounting annular disks on a rotary base rotatingly driven by a disk drive motor in the conventional construction, surface run-out of respective flange portion and disk of the rotary base and axis run-out relative to rotation center appear in collective manner. It is quite difficult to restrict dynamic surface run-out and axis run-out on the disk in rotation. It would require substantially high cost for producing the disk drive unit for restricting surface run-out and axis run-out.

On the other hand, in the recent years, demand for mobile application, such as personal computer, is growing to promote further reduction of size and thickness of the disk drive unit. However, the conventional construction cannot satisfy the demand set forth above.

In this circumstance, the inventors have made extensive study for realizing reduction of thickness of the disk drive, realizing high precision control of surface run-out and axis run-out, realizing high recording density by integrally forming the disk and the rotary shaft of the disk drive motor, and thus providing a shaft integrated type glass disk substrate through a glass molding process.

For example, a structure of die for press molding of a glass substrate of the disk constructed from a disk member having a shaft shaped portion at the center portion of the optical disk, magnetic disk and so on has been illustrated in FIGS. 22 and 23, for example. Also, the press molding process is illustrated in FIGS. 24 to 26.

In the first conventional example, as shown in FIGS. 22 and 25, the die for performing press molding is constructed with an upper die 114 for press molding an upper surface of a disk member 125, and a lower die 116 preformed with a shaft forming hole portion 116a of the shape corresponding to a shaft shaped portion 124 for press molding the shape of the shaft shaped portion 124. The die is used in combination with a height restriction plate 115 for restricting thickness of the disk member 125 when the die is pressed. The shaft forming hole portion 116a is not formed as a through hole but is provided as recessed hole.

In the practical press molding operation, as shown in FIGS. 23 to 26, a nitric material 122, such as glass is placed between the upper die 114 and the lower die 116. Then, positioning of the upper die 114 and the lower die 116 is adjusted by means of the height restriction plate 115. The height restriction plate 115 also serves as guide for the upper die 114 and the lower die 116. The upper die 114 and the lower die 116 are sandwiched between stages 117 and 118 which are controlled in temperature by heaters 119 and 120. The stages 117 and 118 are heated by the heaters 119 and 120 for heating the upper die 114 and the lower die 116 to heat the nitric material 122 up to a temperature (near glass softening temperature) for performing glass molding.

Next, deformation is caused in the nitric material 122 due to application of pressure by a press 121 to form a molded product 123 formed from a disk member 125 illustrated in FIGS. 24 to 26.

However, the tip end of the shaft shaped portion 124 of the molded product 123 formed by the die structure set forth above cannot be forms into the shape accurately corresponding to the lower die 116 due to presence of residual air which cannot be discharged through the shaft forming hole portion 116a of the lower die 116 upon molding. This influences for the precision of shape of the shaft portion. Furthermore, in the worst case, the edge portion can be formed in reversed arc-shape. On the other hand, in design, it is possible to eliminate influence of the residual air. However, it becomes necessary to perform post process, such as cutting of the tip end portion 124a of the shaft shaped portion 124.

On the other hand, even in the disk member 125, the residual air for the shaft portion during molding step also affects the disk portion and makes flatness and circularity of the disk member 125 insufficient for the demanded precision.

For this reason, it becomes necessary to mold a disk having greater diameter than the desired size and to perform post process such as treatment for the outer periphery portion of the molded product 123 or treatment for the outer shape of the disk member 125.

SUMMARY OF THE INVENTION

The present invention has been worked out in view of the problem set forth above. It is therefore an object of the present invention to provide a disk press die and a molding process of a disk with a shaft shaped portion, which can perform glass molding process of a glass disk substrate integrally formed with a shaft portion having a glass substrate for a magnetic disk having ultra smooth surface adapted for high density magnetic recording and thus can realize a disk integrated motor.

Another object of the present invention is to provide a press die and a molding process of a disk with a shaft shaped portion which permits production of a plurality of molded products at one molding cycle.

In a first aspect of the present invention, there is provided a press die for press molding of a glass substrate of a disk member with a shaft shaped portion at a center thereof, comprising:

an upper die forming an upper surface of the disk member;

an intermediate die having a shaft forming hole portion for forming a shaft shaped portion projecting from a disk portion of the disk member, and forming at least a lower surface of the disk portion;

a lower die for forming a lower surface of the shaft shaped portion; and a guide member for guiding the upper die, the intermediate die and the lower dies.

Here, the shaft forming hole portion of the intermediate die may be a through hole.

The guide member may define depression amount of a press by the upper die upon press molding.

The intermediate die may have the shaft forming hole portion for forming a shaft shaped portion projecting from a disk portion of the disk member and a circular recess for forming at least a lower surface of the disk portion.

The depth of the circular recess of the intermediate die may be greater than or equal to a half of a height of the disk portion.

The depth of the recess of the intermediate die may be equal to a height of the disk and an upper surface of the intermediate die defines depression amount of a press by the upper die during press molding operation.

The intermediate die may be formed with an outer frame and a bottom frame, the recess may be defined by the outer frame and the bottom frame, and the outer frame of the intermediate frame may define depression amount of a press by the upper die during press molding operation.

In a second aspect of the present invention, there is provided a molding process of a disk with a shaft shaped portion for press molding a glass substrate of a disk member having the shaft shaped portion at a center thereof, using an upper die performing press molding from an upper surface, an intermediate die having a shaft forming hole portion for forming a shaft shaped portion and a lower die for forming a lower surface of the shaft shaped portion, comprising the steps of:

placing a glass material of revolving body shape having a circular cross-section in a direction perpendicular to its center axis and including a circular section at least greater than the shaft forming hole portion, on the shaft forming hole portion of the intermediate die; and subsequently performing press molding for the glass material.

In a third aspect of the present invention, there is provided a molding process of a disk with a shaft shaped portion for press molding a glass substrate of a disk member having the shaft shaped portion at a center thereof, using an upper die performing press molding from an upper surface, an intermediate die having a shaft forming hole portion for forming a shaft shaped portion and a lower die for forming a lower surface of the shaft shaped portion, comprising the steps of:

placing a glass material on the shaft forming hole portion of the intermediate die with aligning a center axis of the glass material with a center axis of the shaft forming hole portion; and subsequently performing press molding for the glass material.

Here, the shaft forming hole portion of the intermediate die may be chamfered at least on a side on which the glass material is placed.

A mass weight of a spherical glass material may be set equal to a mass weight of a molded product, a dimension of the shaft forming hole portion of the intermediate die may be set equal to the shaft shaped portion of the product to be molded, and a dimension of a height restricting member may be determined so that a clearance between the intermediate die and the upper die may become equal to a dimension of the product to be molded.

In a fourth aspect of the present invention, there is provided a press die for press molding a glass substrate of a disk member having a shaft shaped portion at a center, comprising:

an upper die for performing press molding from an upper surface;

an intermediate die having a plurality of shaft forming hole portions for forming shaft shaped portions, the shaft forming hole portions being arranged in a manner not interfering with each other;

a lower die for forming a lower surface of the shaft shaped portions; and a height restricting member for determining depression amount of a press.

In a fifth aspect of the present invention, there is provided a molding process of a disk with a shaft shaped portion for press molding a glass substrate of a disk member having the shaft shaped portion at a center thereof, using an upper die performing press molding from an upper surface, an intermediate die having a shaft forming hole portion for forming a shaft shaped portion and a lower die for forming a lower surface of the shaft shaped portion, comprising the steps of:

placing a plurality of glass materials of revolving body shape each having a circular cross-section in a direction perpendicular to its center axis on the shaft forming hole portions of the intermediate dies of the press die respectively; and subsequently performing press molding for the glass material for producing disk members with shaft shaped portions with sufficient concentricity.

In a sixth aspect of the present invention, there is provided a press die for press molding a glass substrate of a disk member having a shaft shaped portion at a center, comprising:

an upper die for performing press molding from an upper surface;

a plurality of intermediate dies, each having a shaft forming hole portion for forming the shaft shaped portion;

a lower die for forming a lower surface of the shaft shaped portions; and a height restricting member for determining depression amount of a press.

In a seventh aspect of the present invention, there is provided a molding process of a disk with a shaft shaped portion for press molding a glass substrate of a disk member having the shaft shaped portion at a center thereof, using an upper die performing press molding from an upper surface, an intermediate die having a shaft forming hole portion for forming a shaft shaped portion and a lower die for forming a lower surface of the shaft shaped portion, comprising the steps of:

placing a plurality of glass materials of revolving body shape each having a circular cross-section in a direction perpendicular to its center axis on the shaft forming hole portions of the intermediate dies of the press die respectively; and subsequently performing press molding for the glass material for producing a plurality of disk members with shaft shaped portions simultaneously with sufficient concentricity between each disk member and corresponding shaft shaped portion.

Since the press die for press molding of the glass substrate of the disk member with the shaft shaped portion at a center thereof, according to the present invention, includes the upper die forming the upper surface of the disk member, the intermediate die having the hole for forming the shaft shaped portion projecting from the disk portion of the disk member and forming at least the lower surface of the disk portion, the lower die for forming the lower surface of the shaft shaped portion and the height restricting member for determining the depression amount of the press, gas in the shaft forming hole portion will never reside during molding process to permit molding into correct shape and to achieve satisfactory concentricity between the shaft shaped portion and the disk member. Furthermore, by adapting mass weight of the glass material, shapes of respective dies and dimension of the height restricting member to the final dimension of the disk, it becomes possible to produce the shape of the disk only by press molding without requiring any treatment after molding. Furthermore, since the shaft forming hole portion in the intermediate die is the through hole, the shaft shaped portion can be accurately and optimally molded.

On the other hand, since the press die of the present invention for press molding the glass disk is constructed with the upper die, the lower die and the intermediate die processed into the shape of the shaft shaped portion and the lower surface of the disk portion of the molded product, the outer periphery of the molded product is restricted by the circular recess of the intermediate die. On the other hand, since the shaft portion also restricted by the shaft shaped portion of the intermediate die, circularity of the disk portion and the concentricity between the disk portion and the shaft portion can be certainly achieved.

Furthermore, in the press die of the present invention, by constructing the height dimension of the intermediate die to be equal to the molded product, the outer periphery of the molded product is restricted by the circular recess of the intermediate die. On the other hand, since the shaft portion is restricted by the shaft forming hole portion of the intermediate die, satisfactory circularity of the disk portion and satisfactory concentricity between the disk portion and the shaft portion can be certainly achieved. Also, according to the dimension of the intermediate die in the height direction, the dimension of the molded product in the height direction can be determined.

Also, the press die according to the present invention includes the intermediate die in divided construction to eliminate necessity of treatment for forming the recess of the die. Also, the intermediate frame and the outer frame are only required machining of plane, hole and outer periphery to facilitate machining to achieve sufficient precision.

The molding process of the disk with the shaft shaped portion, according to the present invention, for press molding the glass substrate of the disk member having the shaft shaped portion at the center, comprises the steps of placing the glass material of revolving body shape having a circular cross-section in the direction perpendicular to the center axis on the shaft forming hole portion of the intermediate die with aligning the center axis of the glass material with the center axis of the shaft forming hole portion, and subsequently performing press molding for the glass material to obtain the disk with the shaft shaped portion having satisfactory circularity.

On the other hand, the molding process of the disk with the shaft shaped portion, according to the present invention, for press molding the glass substrate of the disk member having the shaft shaped portion at the center, comprises the steps of placing the glass material on the shaft forming hole portion of the intermediate die with aligning the center axis of the glass material with the center axis of the shaft forming hole portion, and subsequently performing press molding for the glass material for certainly achieving concentricity between the disk portion and the shaft portion.

In the molding process set forth above, since the shaft forming hole portion in the intermediate die is chamfered at least on the side which the glass material is to be placed, it is possible to stably achieve satisfactory concentricity between the disk portion and the shaft shaped portion.

In the molding process, since the mass weight of the spherical glass material is set equal to the mass weight of the product to be molded, and the dimension of the shaft forming hole portion of the intermediate die is set to be equal to the dimension of the shaft shaped portion of the product to be molded, and a dimension of the height restricting member is determined so that the clearance between the intermediate die and the upper die becomes equal to a dimension of the product to be molded, it is possible to eliminate necessity of machining after molding. Also, gas will never reside in the shaft forming hole portion. Thus, the desirable shape of disk can be produced only by the press molding.

The press die, according to the present invention, for press molding the glass substrate of the disk member having the shaft shaped portion at the center, comprises the upper die for performing press molding from the upper surface, the intermediate die having a plurality of shaft forming hole portions for forming shaft shaped portions, the shaft forming hole portions being arranged in a manner not interfering with each other, the lower die for forming the lower surface of the shaft shaped portions, and the height restricting member for determining depression amount of the press. Therefore, the press die can be simply constructed with the upper die, the lower die and the intermediate die with a plurality of the holes. Thus, maintenance of the die becomes easy. Furthermore, a plurality of disks with the shaft shaped portions can be produced by one cycle of press molding.

The molding process of the disk with the shaft shaped portion, according to the present invention, for press molding the disk member having the shaft shaped portion at the center thereof, comprises the steps of placing glass materials of revolving body shape having the circular cross-section in a direction perpendicular to the center axes on the holes of the intermediate die, and subsequently performing press molding for the glass material for producing disk members with shaft shaped portions with sufficient concentricity. Therefore, the press die can be simply constructed with the upper die, the lower die and the intermediate die with a plurality of the holes. Also, a plurality of disks with the shaft shaped portions can be produced by one cycle of press molding.

On the other hand, the press die, according to the present invention, for press molding the glass substrate of the disk member having the shaft shaped portion at the center, comprises the upper die for performing press molding from the upper surface, a plurality of intermediate dies, each having the hole for forming the shaft shaped portion, the lower die for forming the lower surface of the shaft shaped portions, and the height restricting member for determining depression amount of the press. Therefore, the press die can be simply constructed with the upper die, the lower die and a plurality of the intermediate dies, each having a plurality of the hole. Thus, maintenance of the die becomes easy. Furthermore, a plurality of disks with the shaft shaped portions can be produced by one cycle of press molding.

The molding process of the disk with the shaft shaped portion, according to the present invention, for press molding the disk member required concentricity between the disk member and the shaft shaped portion at a center thereof, comprises the steps of placing glass materials of revolving body shape having the circular cross-section in a direction perpendicular to the center axes on the shaft forming hole portions of the intermediate die respectively, and subsequently performing press molding for the glass material for producing disk members with shaft shaped portions with sufficient concentricity. Therefore, the press die can be simply constructed with the upper die, the lower die and the intermediate die with a plurality of the shaft forming hole portions. Also, a plurality of disks with the shaft shaped portions can be produced by one cycle of press molding.

On the other hand, the press die, according to the present invention, for press molding the glass substrate of the disk member having the shaft shaped portion at the center, comprises the upper die for performing press molding from the upper surface, a plurality of intermediate dies, each having the shaft forming hole portion for forming the shaft shaped portion, the lower die for forming the lower surface of the shaft shaped portions, and the height restricting member for determining depression amount of the press. Therefore, the press die can be constructed with the upper die, the lower die and a plurality of the intermediate dies, each having a plurality of the shaft forming hole portion in simple construction. Thus, maintenance of the die becomes easy. Furthermore, a plurality of disks with the shaft shaped portions can be produced by one cycle of press molding.

The molding process of the disk with the shaft shaped portion, according to the present invention, for press molding the disk member required concentricity between the disk and the shaft shaped portion at the center comprises the steps of placing glass materials of revolving body shape having a circular cross-section in a direction perpendicular to a center axis on the shaft forming hole portions of the intermediate dies of the press die, and subsequently performing press molding for the glass material for producing a plurality of disk members with shaft shaped portions simultaneously with sufficient concentricity between each disk member and corresponding shaft shaped portion. Therefore, the press die can be simply constructed with the upper die, the lower die and a plurality of the intermediate dies, each having a plurality of the shaft forming hole portion. Thus, maintenance of the die becomes easy. Furthermore, a plurality of disks with the shaft shaped portions can be produced by one cycle of press molding.

On the other hand, since the divided plurality of intermediate dies have the shaft forming hole portions for forming the shaft shaped portion at the center, it is possible to improve the machining precision to permit production of the press die with the shaft forming hole portions in high precision and the precision of the shaft shaped portion of the molded product. Furthermore, even when failure is caused in the molded product due to occurrence of failure in the divided intermediate dies, only faulty fraction of the divided intermediate dies is required to be replaced and remaining fractions can be used without replacing. Thus, maintenance ability can be improved.

One example of the disk integrated motor using the disk with the shaft shape portion according to the present invention is shown in a form of diagrammatic section in FIG. 38. On the other hand, an example of the case using the same sized conventional donut type disk for motor is shown in a form of diagrammatic section in FIG. 39. As can be seen from these examples, comparing with the conventional disk, the thickness can be reduced by more than 30%. Thus, the present invention can contribute for reduction of thickness of the disk drive unit.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
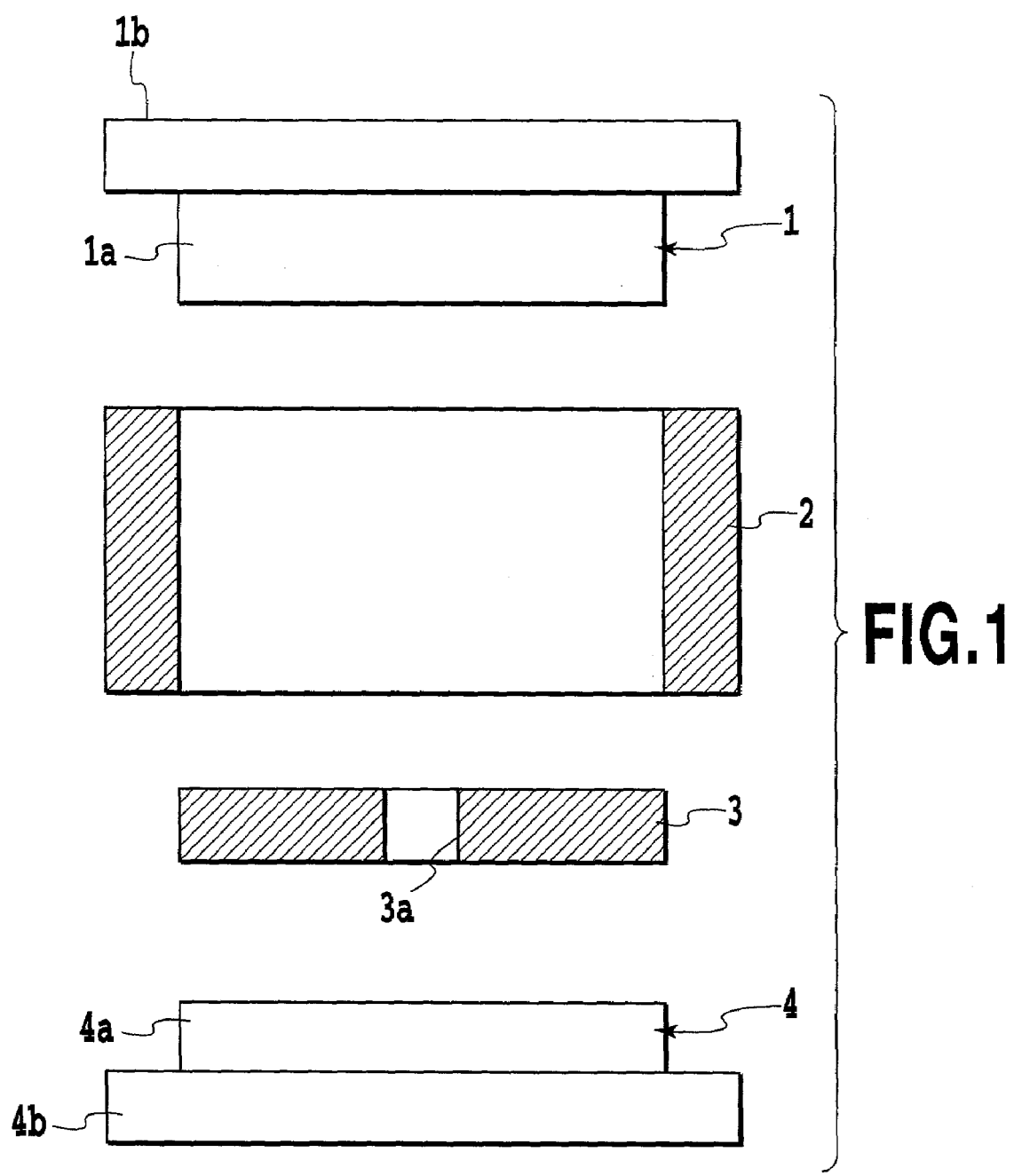
FIG. 1 is an exploded general section of a press die according to the present invention.

As a die for molding glass substrate for a disk according to the present invention, heat resistance, oxidation resistance and mechanical strength against high temperature and high pressure upon molding are required. On the other hand, since the die contacts with the glass at high temperature, the die is required to have low reactivity with glass.

On the other hand, a surface smoothness for high-density magnetic recording medium is required. Also, as a motor bearing, dimensional precision in the order of sub-micron is required.

For satisfying such requirement, a die having a hard metal with good workability as a matrix and formed with a noble metal alloy film as protective film is optimal. However, the die is not limited to the foregoing particular die.

As noble metal alloy film, it is applicable to contain at least one element selected among a group consisted of platinum (Pt), rhenium (Re), iridium (Ir), osmium (Os), palladium (Pd), rhodium (Rh) and ruthenium (Ru) as major component and also contain at least one element selected among a group consisted of tantalum (Ta), hafnium (Hf), tungsten (W), gold (Au), platinum (Pt), rhenium (Re), iridium (Ir), osmium (Os), palladium (Pd), rhodium (Rh) and ruthenium (Ru).

Of course, the die is not specified to one employing the foregoing noble metal alloy film.

As a glass material to be employed in the present invention, it is desirable to have a mechanical strength as a substrate for a magnetic disk. A glass material having Young's modules greater than or equal to 80 GPa is desirable. On the other hand, glass material having high chemical stability and lesser influence for the magnetic recording medium is required. On the other hand, glass material having temperature characteristics adapted to glass molding and lesser influence for the die is required.

As glass material satisfying such requirement, while not limitative, alumino silicate type, alumino borate silicate type, alumino lithium silicate type, zinc alumino silicate type glasses and so on may be applicable.

A viscosity of glass for press molding is preferably a softening point of glass, and preferably in a range of $10^7$ to $10^8$ poise. If the viscosity is greater than the foregoing range, adhesion on the pressing surface of the die can be caused. Furthermore, thermal shrinkage upon cooling becomes large to cause difficulty in precise transfer of the pressing surface of the die. Thus, it becomes not possible to obtain target precision. Furthermore, breakage of the glass substrate can be caused. On the other hand, when the viscosity is smaller than the foregoing range, sufficient deformation speed cannot be obtained. When greater load is applied for obtaining sufficient deformation speed, breakage of the glass substrate can be caused.

On the other hand, a press temperature is preferably as low as possible in view point of duration of the die and energy efficiency. As preferred press molding temperature, a temperature close to the glass softening point (the temperature where the viscosity of glass is $10^{7.6}$ poise) is suitable. The preferred press molding temperature is lower than or equal to 700° C., more preferably lower than or equal to 650° C., and further preferably lower than or equal to 600° C.

As a pressure for press molding, the pressure in a range of 10 kgf/cm$^2$ to 600 kgf/cm$^2$ is preferred. Of course, the pressure is to be variable depending upon viscosity of the glass. When viscosity of glass is high, the preferred pressure is to be less than or equal to 100 kgf/cm$^2$. Even at the softening point of glass, the suitable pressure is to be lower than or equal to 600 kgf/cm$^2$. If the pressure is too high, breakage of glass can be caused. In significant case, deformation of the die can be caused. In viewpoint of efficiency of molding, a pressure close to a critical pressure not causing breakage of the glass may be used. Such critical pressure may be derived experimentally.

According to the present invention, the press die for press molding of the glass substrate of the disk member having the shaft shaped portion at the center portion, includes an upper die, a lower die, an intermediate die having a shaft forming hole portion for forming the shaft shaped portion, and a height restricting plate serving as a height restricting member for restricting height. A gas, such as air, enclosed in the shaft forming hole portion by glass material placed on the through hole of the intermediate die may be discharged through a gap between the intermediate die and the lower die according to penetration of softened glass into the shaft forming hole portion. Therefore, upon molding, no gas will resides in the shaft shaped portion to mold into accurate shape.

Furthermore, in order to avoid residual gas, such as air, surface roughness in the contact surfaces between the intermediate die and the lower die is important and is preferred as rough as possible in the extent not affecting for precision in dimension of design, preferably greater than or equal to 0.1 S. On the other hand, during the molding process, the press pressure for filling the glass material into the through opening for forming the shaft shaped portion is preferred to be as low as possible for facilitating discharge of gas, and desirably lower than or equal to 100 kgf/cm$^2$.

On the other hand, according to the present invention, a molding process of the disk with the shaft shaped portion employs the foregoing press die. The glass material having a circular section in a direction perpendicular to a center axis and having a revolving body shape including a circular section greater than the shaft forming hole portion, for example, spherical glass material may be used to facilitate high precision concentricity between the shaft shaped portion and the disk member in the molded product by facilitating accurately matching the center axis of the shaft forming hole portion and the center axis of the glass material. On the other hand, upon press molding, by uniformly distributing the glass material radially from the center axis, the molded product with high circularity can be obtained.

Furthermore, by providing chamfering process, such as fillet process and so on at least on the side where the glass material is mounted, in the shaft forming hole portion of the intermediate die of the press die, contact between the shaft forming hole portion and the glass material can be stabilized to facilitate high precision concentricity between the shaft shaped portion and the disk member in the molded product.

On the other hand, by adapting the mass weight of the glass material, shapes of respective dies, dimension of the height restricting plate and so on to the final dimension of the disk member, the molded disk product having the disk member and the shaft shape portion can be obtained at high precision only by press molding. Furthermore, a plurality of press molded products can be formed simultaneously through one cycle of press molding operation.

Other objects and feature of the present invention will become apparent from several embodiments which will be explained with reference to the accompanying drawings.

(First Embodiment)

FIG. 1 is a section showing the first embodiment of a press die for implementing a molding process of a disk with a shaft shaped portion (outer diameter of disk portion is 25.4 mm, a thickness is 0.38 mm, a diameter of the shaft portion is 4.0 mm, a length of the shaft portion is 1.5 mm), FIGS. 2 to 5 are explanatory illustrations showing the molding process.

As shown in FIG. 1, the press die as the first embodiment for implementing the molding process of the disk with the shaft shape portion, according to the present invention, is constructed with an upper die 1, a height restriction plate 2 serving as a height restriction member for restricting height, an intermediate die 3 provided with a shaft forming hole portion 3a for forming the shaft shaped portion 12 of a molded product 11 at the center, and a lower die 4.

The upper die 1 and a lower die 4 have protective films formed of noble metal alloy on a surface of a hard metal having a diameter of 30 mm in the press portion. The surface of the protective film has a surface roughness Ra of 0.5 nm and flatness of 0.2 μm.

On the other hand, the intermediate die is provided with the shaft forming hole portion having a diameter of 4.0 mm. On the surface of hard metal of 1.5 mm thick, the protective film formed of noble metal alloy is provided.

Here, diameter and thickness of the shaft forming hole portion are determined in consideration of thermal shrinkage of the glass during molding and thus has greater design values than the targeted glass substrate with the shaft shaped portion.

Correction of dimension by thermal shrinkage can be derived from thermal expansion coefficient of the material or other parameters. Final correction can be experimentally adjusted adapting to the molding condition.

In the press die of the present invention, the upper die 1 and the lower die 4 are respective members for press molding of an upper surface (information recording surface) of the disk member 13 of the molded product 11 and a lower surface (thrust surface) of the shaft shaped portion 12, and are of convex shape with pushing portions 1a and 4a and flange portions 1b and 4b having slightly greater diameters than those of the pushing portions 1a and 4a. The pushing portions 1a and 4a are adapted to engage with a hollow portion defined by the height restriction plate 2 in vertical direction. Furthermore, the height restricting plate 2 is a cylindrical member for restricting height of the disk member (thickness of the disk is 0.38 mm) and is formed into an annular ring shape formed of hard metal. The intermediate die 3 is disposed within the hollow space of the height restriction plate 2 to clamp between the upper and lower dies 1 and 4. By abutting the flange portions 1b and 4b of the upper die 1 and the lower die 4, movement of the press dies in the height direction is restricted. Therefore, by the height restricting member 2, the thickness of the molded product 11 is defined.

Figure 2:
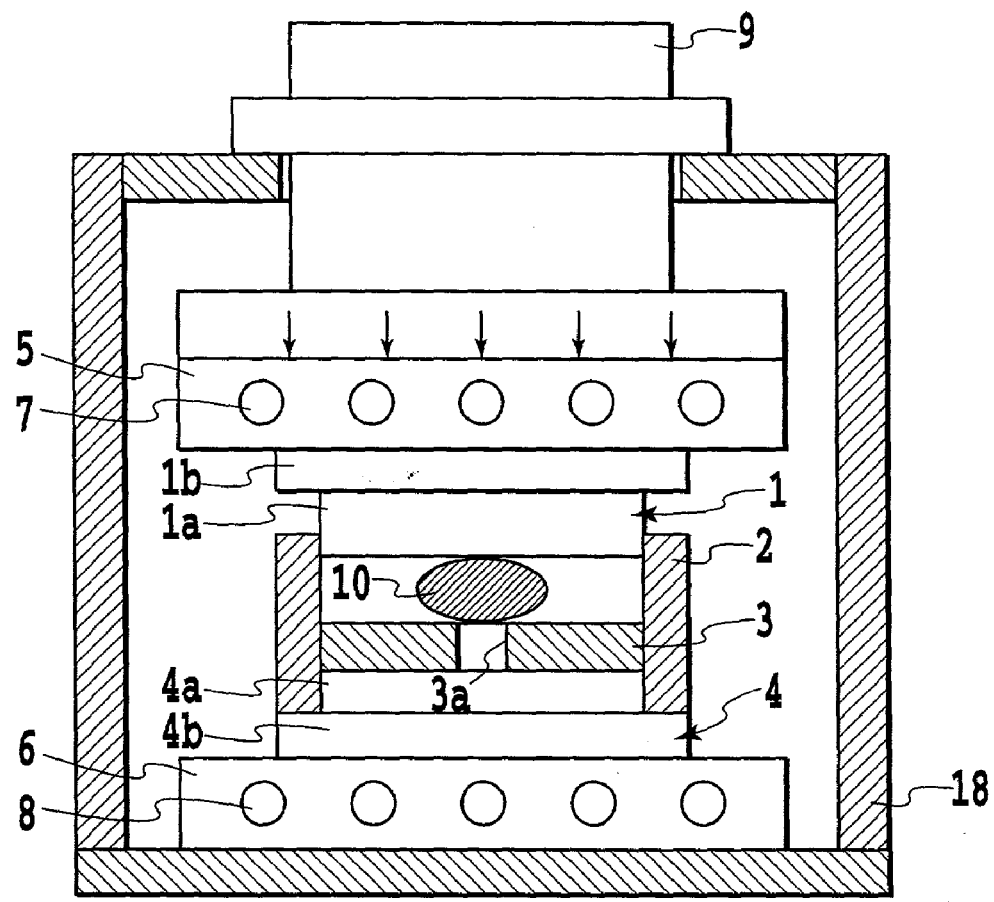
FIG. 2 is a section of a press die performing molding by means of a press die of FIG. 1 for implementing a molding process according to the present invention.
Figure 3:
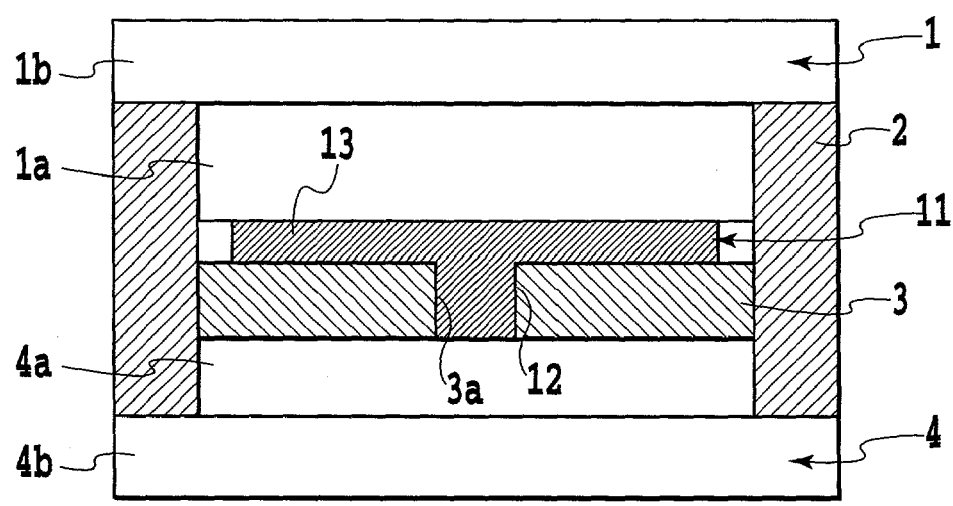
FIG. 3 is a partial section showing a die portion for performing molding by means of the press die of FIG. 1 in the first embodiment of the present invention.

In the press die of the present invention, for press molding the disk, as shown in FIG. 2, at first, the intermediate die 3 is mounted on the lower die 4. Then, the height restricting plate 2 for restricting height is mounted surrounding the pushing portion 4a of the lower die 4 and the intermediate die 3. Next, slightly compressed spherical shape glass material of alumino borate silicate type glass (softening temperature 600° C.) is placed on the shaft forming hole portion 3a at the central portion of the intermediate die 3. At this time, the height restricting plate 2 is designed to also serve as a guide for the pushing portion 1a of the upper die 1. Then, such set of the dies are mounted on a stage 6. Thereafter, a stage 5 is lowered to abut onto the upper die 1 to apply a load of 50 kgf for clamping the dies by the stages 5 and 6.

Then, temperatures of the stages 5 and 6 are elevated by heating with heaters 7 and 8. Thus, the upper die 1, the intermediate die 3 and the lower die 4 of the press die is elevated up to a temperature of 600° C. near the softening point to perform molding of the glass material 10. After reaching 600° C., the stages 5 and 6 are maintained in place for 5 minutes. Thereafter, a load is increased up to 5000 kg during a 3 minutes period by means of a press 9 to pressurize the die for press molding.

Subsequently, the heaters 7 and 8 are turned OFF and the load is lowered to 1000 kgf. The stages 5 and 6, the upper die 1, the intermediate die 3, the lower die 4 and the glass material 10 are cooled down to a strain point temperature of 440° C. Then, the load is lowered to 50 kgf, and the molded products are removed at a temperature lower than or equal to 100° C.

Press molding set forth above is performed within an enclosed chamber surrounded by a casing 18 or the like under inert atmosphere filled with nitrogen. Nitrogen to be filled in the molding chamber is filtered for dust control so that press molding can be performed in clean environment.

Figure 4:
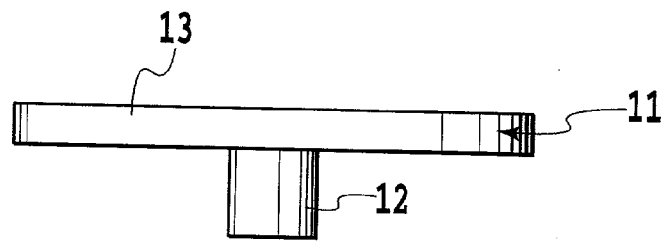
FIG. 4 is a front elevation of a molded product of FIG. 3.
Figure 5:
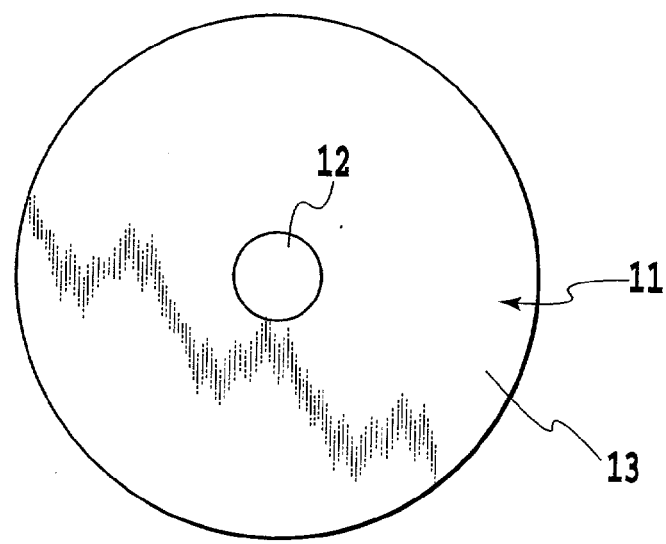
FIG. 5 is a bottom view of the molded product of FIG. 4.

By the foregoing molding process, the glass material 10 is formed into the shape set on the mold as the molded product shown in FIGS. 4 and 5. Dent due to presence of the residual air in the shaft portion and dent even in the disk portion due to presence of the residual air will never appear to obtain the disk with the shaft shaped portion with high precision. On the other hand, the surface roughness of the press surface of the upper die is transferred precisely so that the surface roughness Ra of the information recording surface of the disk portion was 0.5 nm, and the circularity was 25 μm which falls within the target range of 30 μm. On the other hand, the flatness of the disk portion was 1 μm which falls within the target flatness of 2.0 μm. Furthermore, the concentricity between the disk portion and the shaft portion was 2 μm as targeted. Thus, the motor shaft falling within the target range can be obtained.

As a result of the foregoing process, the press die for implementing the press molding process of the disk with the shaft shaped portion, according to the present invention, is constructed with the upper die 1, the height restricting plate 2, the intermediate die 3 and the lower die 4 to prevent residual gas, such as air or the like, in the tip end portion of the shaft forming hole portion 3a as a through hole of the intermediate die 3 to obtain the press molded product 11 having the shape as designed with precisely transferring the die.

The present invention has been illustrated and discussed in terms of the shown embodiment having the height restricting plate 2 in cylindrical member. However, it should not be specified to the shape and arrangement as the hollow ring shaped member set forth above. For instance, it is possible to arrange the height restricting plate 2 between the pushing portion 1a of the upper die 1 and the pushing portion 4a of the lower die 4, to arrange the intermediate die 3 on the lower die 4 to mount the height restricting plate 2 thereon, or to mount the intermediate die 3 on the lower die 4 and to provide an appropriate guide means between the upper die 1 and the lower die 4 to provide only guiding function without restricting the height for controlling the height by detecting the height between the upper die 1 and the lower die 4 by means of a distance sensor. On the other hand, even in various embodiment, construction and arrangement of the height restricting plate can be similarly modified.

(Second Embodiment)

Figure 6:
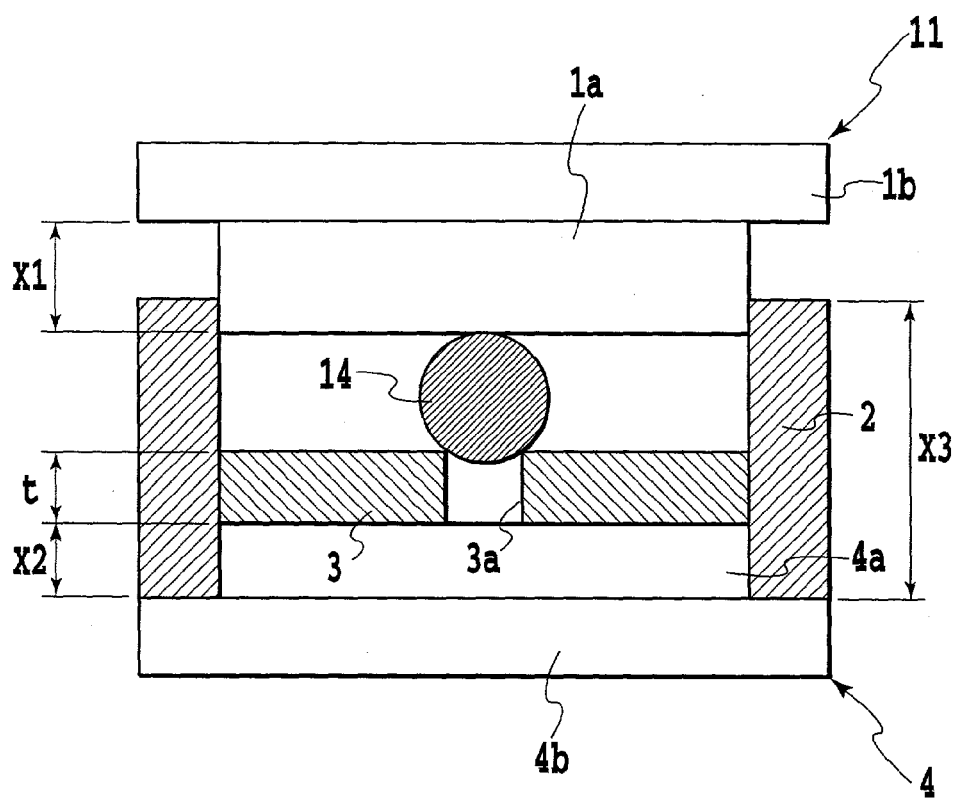
FIG. 6 is a partial section showing the press die portion in the second embodiment of the present invention.

FIGS. 6 to 9 show the second embodiment in the press die for implementing the molding process of the disk with the shaft shaped portion according to the present invention. As shown in FIG. 6, a glass material 14 is preliminarily finished into the spherical shape.

The press die used in the second embodiment of the present invention has the same construction and dimension as the die used in the foregoing first embodiment. Therefore, the press die is constructed with the upper die 1 with the pushing portion 1a and the flange portion 1b, the cylindrical height restricting plate 2 as the restricting member for restricting the height, the intermediate die 3 having the shaft forming hole portion 3a for forming the shaft shaped portion 16 of the molded product 15, and the lower die 4 with the pushing portion 4a and the flange portion 4b. Press molding is performed by placing the spherical glass material 14 of ø7.39 on the through hole 3a of intermediate die 3 according to the same press molding process as the first embodiment.

In the shown embodiment, the spherical glass material 14 placed on the shaft forming hole portion 3a of the intermediate die 3 of 4.003 mm diameter can be placed the center axis thereof matching with the center axis of the shaft forming hole portion 3a.

Figure 7:
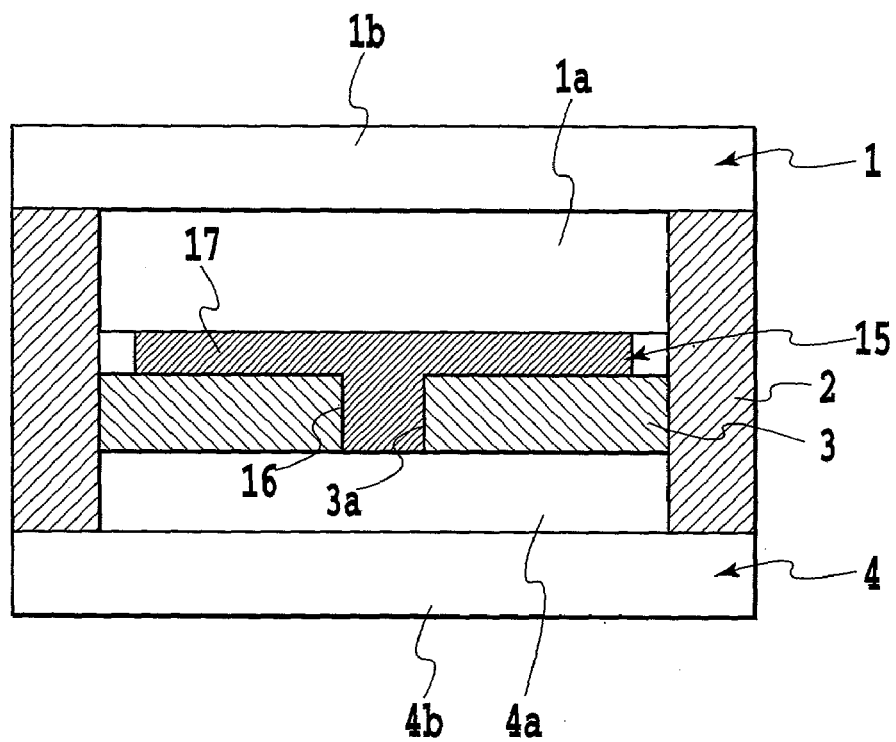
FIG. 7 is a partial section of a molded product portion of the die of the present invention illustrated in FIG. 6.
Figure 8:
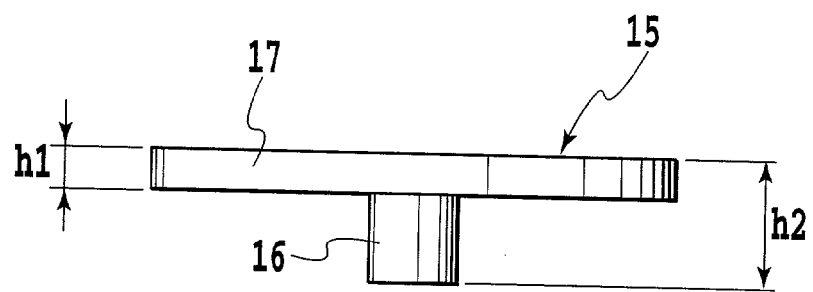
FIG. 8 is a front elevation of the molded product in FIG. 7.
Figure 9:
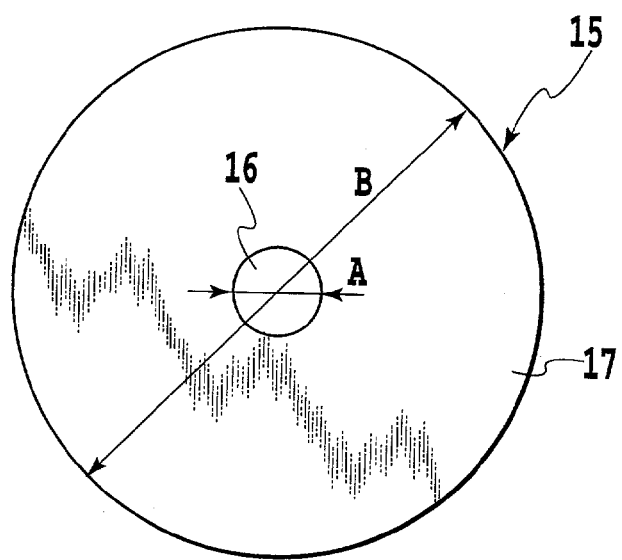
FIG. 9 is a bottom view of the molded product of FIG. 8.

By press molding, the glass material is spread in circular shape about the shaft forming hole portion 3a at the center of the intermediate die 3 for molding the disk member 17 with the shaft shaped portion 16 by the molding surface of the pushing portion 1a of the upper die 1 and the upper surface of the intermediate die 3 and the shaft forming hole portion 3a for forming the shaft shaped portion. Also, concentricity between the shaft shaped portion 16 and the disk member 17 can be certainly provided. Namely, as shown in FIGS. 7 to 9, satisfactory concentricity between the shaft shaped portion 16 of a diameter A and the disk member 17 of a diameter B is certainly achieved.

The obtained disk with the shaft shaped portion is molded to the shape as set on the die similarly to the first embodiment. Dent due to presence of the residual air in the shaft portion and dent even in the disk portion due to presence of the residual air will never appear to obtain the disk with the shaft shaped portion with high precision. On the other hand, the surface roughness of the press surface of the upper die is transferred precisely so that the surface roughness Ra of the information recording surface of the disk portion was 0.5 nm, and the circularity was 25 μm which falls within the target range of 30 μm. On the other hand, the flatness of the disk portion was 1 μm which falls within the target flatness of 2.0 μm.

Furthermore, the concentricity between the disk portion and the shaft portion was 1.5 μm smaller than 2 μm as targeted. Therefore, the motor shaft falling within the target value can be obtained.

(Third Embodiment)

In the third embodiment of the molding process of the disk with the shaft shaped portion according to the present invention, the construction and dimension of the press die is similar to the foregoing first embodiment. The mass weight of the spherical glass material 14 is preliminarily adjusted to be equal to the mass weight (528.25 mg) of the final shape of the disk member 17 of the molded product 15.

On the other hand, as shown in FIG. 6, a dimension t of the intermediate die 3 in the thickness direction is adapted to the dimension of the shaft shaped portion 16 of the final shape of the disk member 17 of the molded product 15. Furthermore, a dimension as a sum of a thickness X1 of the pushing portion 1a of the upper die 1, a thickness X2 of the pushing portion 4a of the lower die 4, a thickness t of the intermediate die and a thickness of the disk member 17 of the molded product 15 of the final shape, is set equal to a height X3 of the height restricting plate.

As shown in FIGS. 8 and 9, by performing press molding with the combination set forth above, the diameter A of the shaft shaped portion 16 and the diameter B of the disk member 17 and respective heights h1 and h2 of the press molded product 15 can be make equal to the dimension of the final shape of the disk member 17 of the molded product 15.

However, when high dimensional precision is required, correction has to be made in consideration of thermal shrinkage of the die material and the glass to be molded. If further precision is required, correction on the basis of the result of actual molding experiments can be made.

In case of the shown embodiment, a total dimension 26.880 mm as a sum of 15 mm of thickness of the pushing portion 1a of the upper die 1, 10 mm of thickness of the pushing portion 4a of the lower die 4, 1.5 mm of the intermediate die 3 and 0.38 mm of thickness of the disk member 17 of the molded product 15 of the final shape, was matched with the height of the restricting plate. Then, correction for thermal shrinkage is made for the dimension of the disk with the shaft shaped portion obtained from the foregoing molding condition.

The obtained disk with the shaft shaped portion was molded into the shape precisely corresponding to the die similarly to the first embodiment, and did not have the dent in the shaftshaped portion due to residual air. Also, even in the disk portion, the dent due to residual air did not appear. Then, the disk with the shaft shaped portion having target dimensions of external diameter of 25.4 mm and thickness of 0.38 mm in the disk portion and of diameter of 4.0 mm and length 1.5 mm of the shaft shaped portion can be obtained.

On the other hand, the surface roughness of the press surface of the upper die is transferred precisely so that the surface roughness Ra of the information recording surface of the disk portion was 0.5 nm. The circularity was 25 μm falling within the targeted 30 μm. On the other hand, the flatness of the disk portion was 1 μm falling within the targeted 2 μm.

Furthermore, the concentricity between the disk portion and the shaft portion was 1.5 μm smaller than the targeted 2 μm. Thus, the motor shaft falling within the target dimension could be obtained.

(Fourth Embodiment)

Figure 27:
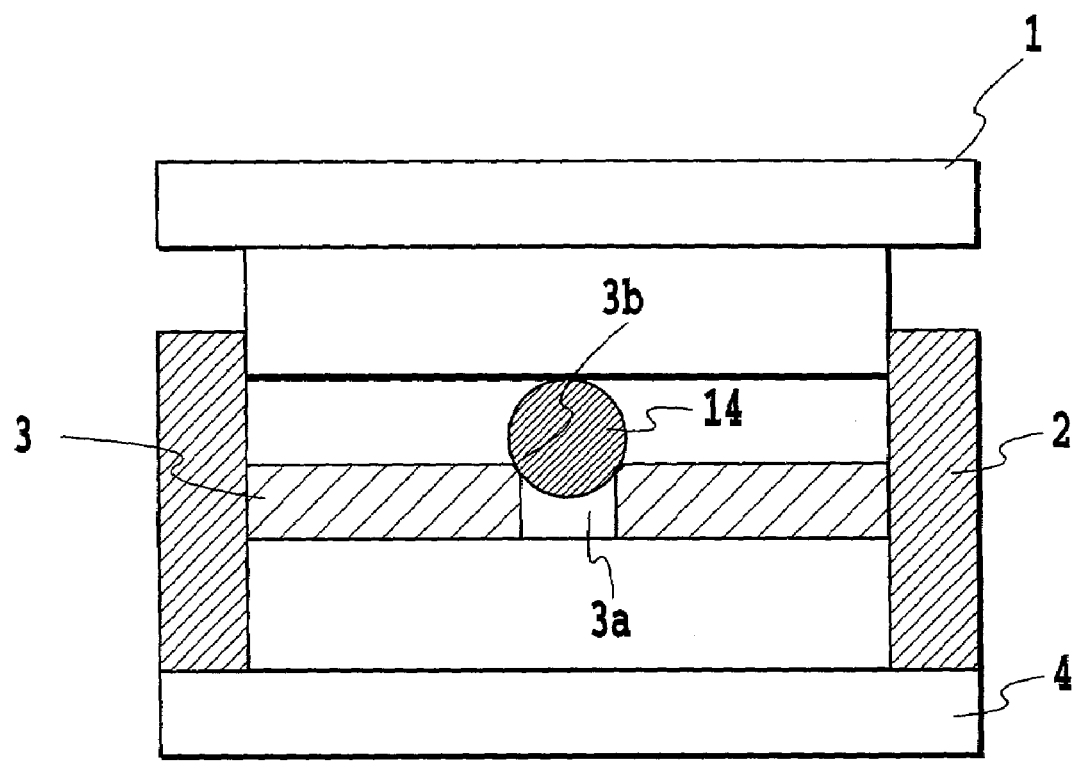
FIG. 27 is a section of the die in the assembled condition in the fourth embodiment of the present invention.

In the fourth embodiment of the molding process of the disk with the shaft shaped portion according to the present invention, the construction and dimension of the press die is similar to the foregoing third embodiment. The mass weight of the spherical glass material 14 is preliminarily adjusted to be equal to the mass weight (528.25 mg) of the final shape of the disk member 17 of the molded product 15. On the other hand, as shown in FIG. 27, C0.2 of chamfer treatment is provided on the side of the glass material of shaft shaped portion 16 of the intermediate die 3.

By chamfer treatment, contact between the shaft forming hole portion of the intermediate die and the glass material is stable and it facilitates achieving of high precision in concentricity between the shaft shaped portion and the disk member of the molted product stably.

The obtained disk with the shaft shaped portion was molded into the shape precisely corresponding to the die similarly to the third embodiment, and did not have the dent in the shaft portion due to residual air. Also, even in the disk portion, the dent due to residual air did not appear. Then, the disk with the shaft shaped portion having target dimensions of external diameter of 25.4 mm and thickness of 0.38 mm in the disk portion and of diameter of 4.0 mm and length 1.5 mm of the shaft shaped portion can be obtained.

On the other hand, the surface roughness of the press surface of the upper die is transferred precisely so that the surface roughness Ra of the information recording surface of the disk portion was 0.5 nm. The circularity was 25 μm falling within the targeted 30 μm. On the other hand, the flatness of the disk portion was 1 μm falling within the targeted 2 μm. Furthermore, the concentricity between the disk portion and the shaft portion was 1.5 μm smaller than the targeted 2 μm. Thus, the motor shaft falling within the target dimension could be obtained.

Fluctuation of concentricity between the molded product was improved in the extent of 20% in comparison with the third embodiment.

(Fifth Embodiment)

Figure 28:
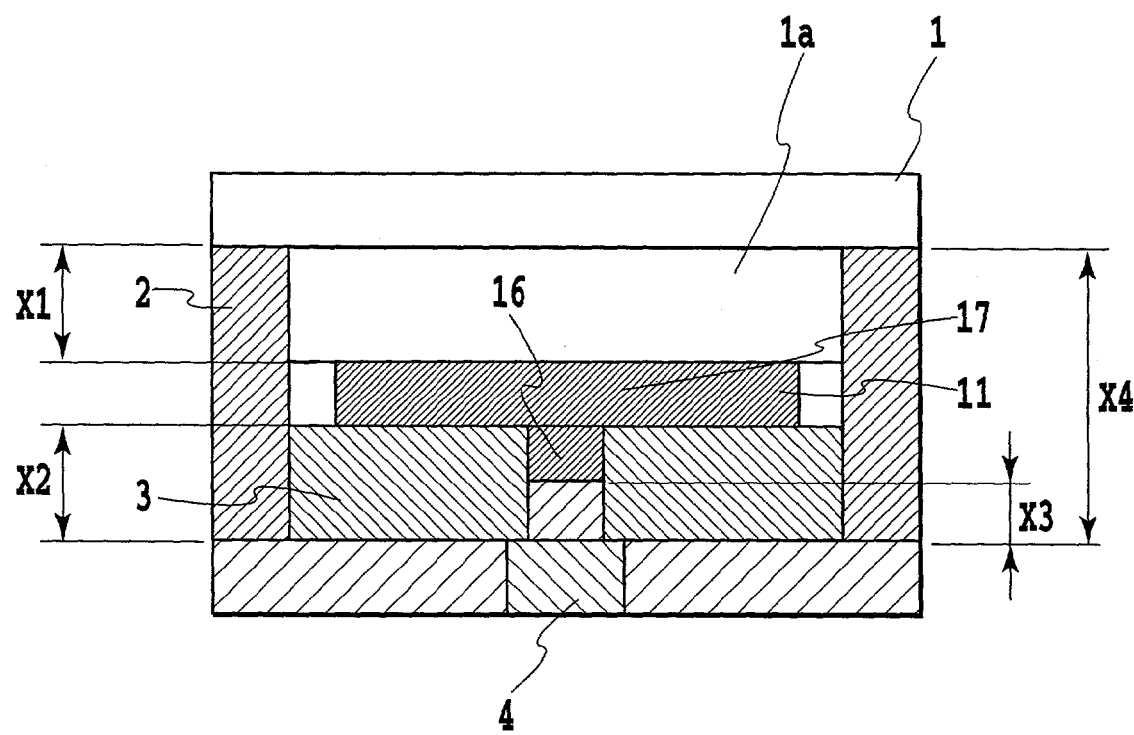
FIG. 28 is a section of the die in the assembled condition in the fifth embodiment of the present invention.

As shown in FIG. 28, the press die used in the fifth embodiment of the present invention is substantially the same as the die used in the foregoing first embodiment. The press die is constructed with the upper die 1 having the pushing portion 1a and the flange portion 1b, the cylindrical height restricting plate 2 serving as the restricting member for restricting the height, the intermediate die 3 having the shaft forming hole portion 3a for forming the shaft shaped portion 16 of the molded product 15 and the lower die 4 having the pushing portion 4a and the flange portion 4b. Press molding is performed by placing the glass material 14 on the shaft forming hole portion 3a as the through hole formed in the intermediate die 3.

As shown in FIG. 28, a difference between the dimension X2 of the intermediate die 3 in the thickness direction and the dimension X3 of the lower die 4 in the thickness direction, is matched with the dimension of the shaft shaped portion 16 of the final shape of the molded product 11. Furthermore, a dimension as a sum of the thickness X1 of the pushing portion 1a of the upper die 1, the dimension X2 of the intermediate die 3 in the thickness direction and a dimension of the disk member 17 of the molded product 11 of the final shape in the thickness direction, is set equal to a height X4 of the restricting plate.

In the shown embodiment, since it is only required to match the difference between the dimension X2 of the intermediate die 3 in the thickness direction and the dimension X3 of the lower die 4 in the thickness direction, with the dimension of the shaft shaped portion 16 of the final shape of the molded product 11, greater thickness can be provided for the intermediate die to improve precision in machining the die. Since the intermediate die contacts with the heater directly, thermal stability can be also improved and thus circularity of the disk portion can be improved.

Press molding was implemented under the same condition as the fourth embodiment.

The obtained disk with the shaft shaped portion was molded into the shape precisely corresponding to the die similarly to the fourth embodiment, and did not have the dent in the shaft portion due to residual air. Also, even in the disk portion, the dent due to residual air did not appear. Then, the disk with the shaft shaped portionhaving target dimensions of external diameter of 25.4 mm and thickness of 0.38 mm in the disk portion and of diameter of 4.0 mm and length 1.5 mm of the shaft shaped portion can be obtained.

On the other hand, the surface roughness of the press surface of the upper die is transferred precisely so that the surface roughness Ra of the information recording surface of the disk portion was 0.5 nm. The circularity was 20 $\mu$m which is improved from the fourth embodiment and falling within the targeted 30 $\mu$m. On the other hand, the flatness of the disk portion was 1 $\mu$m falling within the targeted 2 $\mu$m.

Furthermore, the concentricity between the disk portion and the shaft portion was 1.5 $\mu$m smaller than the targeted 2 $\mu$m. Thus, the motor shaft falling within the target dimension could be obtained.

Fluctuation of concentricity between the molded product was equivalent to that of the fourth embodiment.

(Sixth Embodiment)

Figure 29:
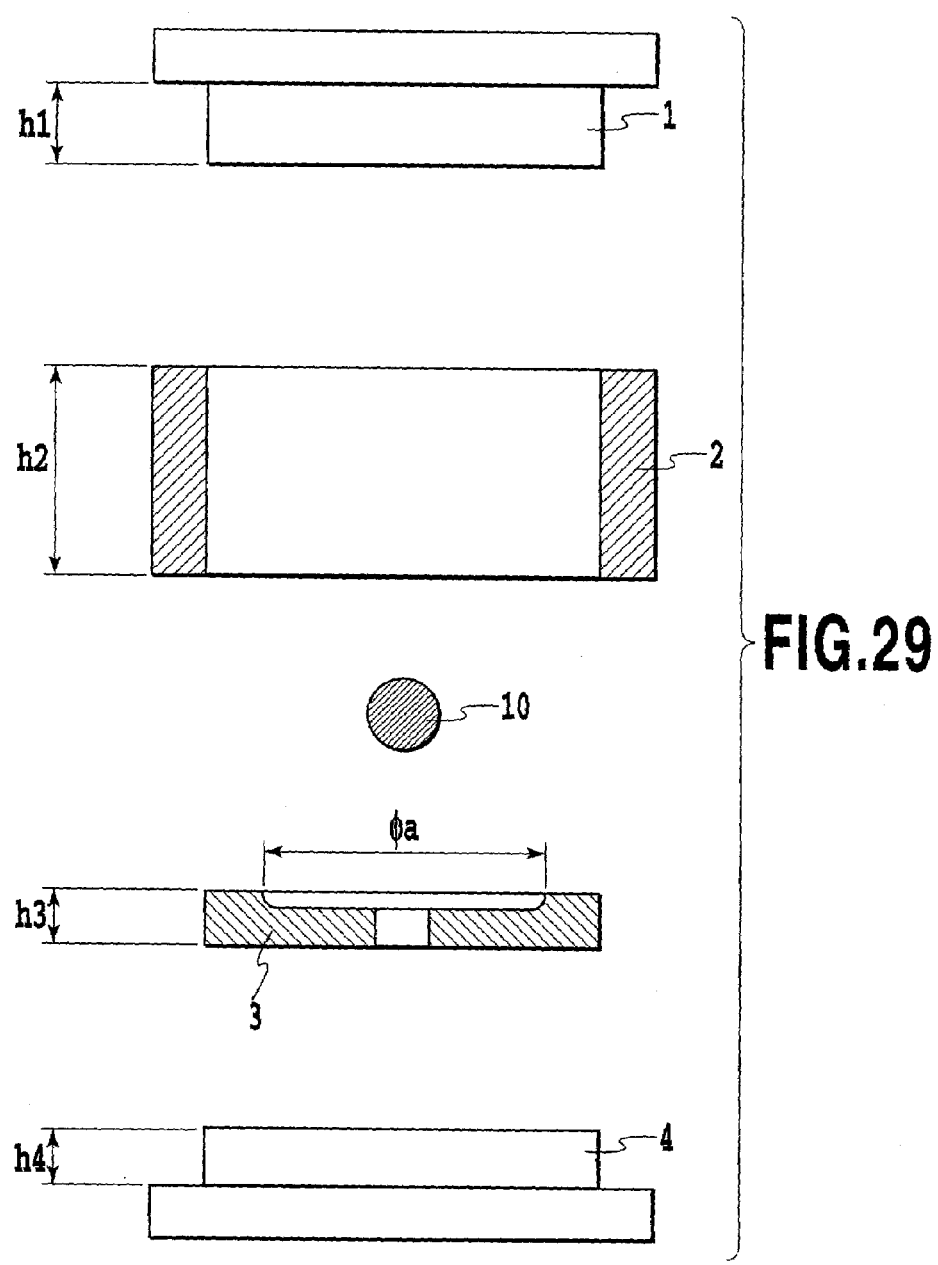
FIG. 29 is a section of the die in the exploded section in the sixth embodiment of the present invention.
Figure 30:
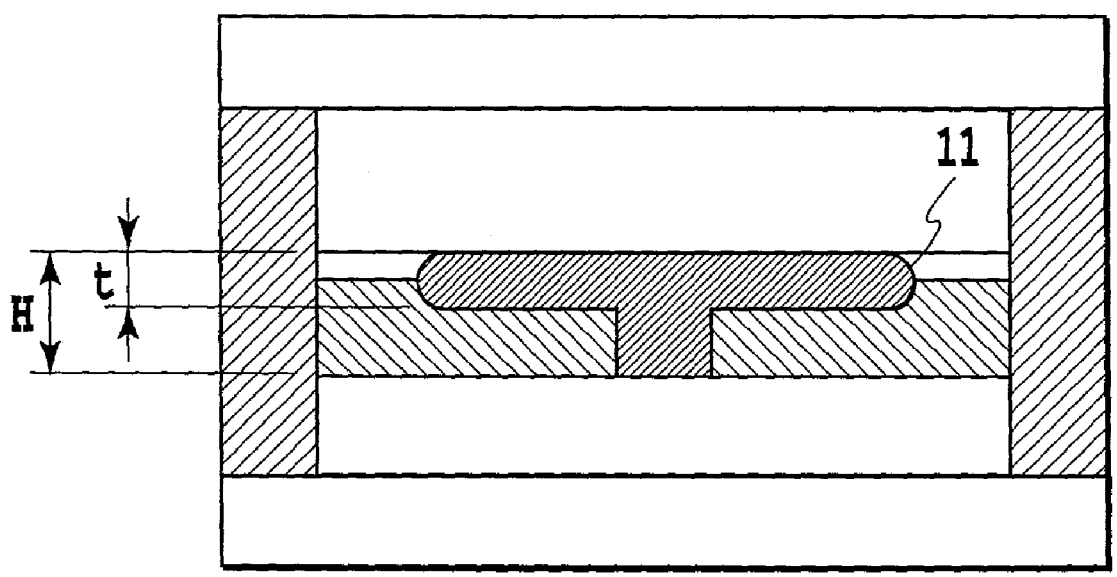
FIG. 30 is a section of the die in the assembled condition in the sixth embodiment of the present invention.
Figure 31:
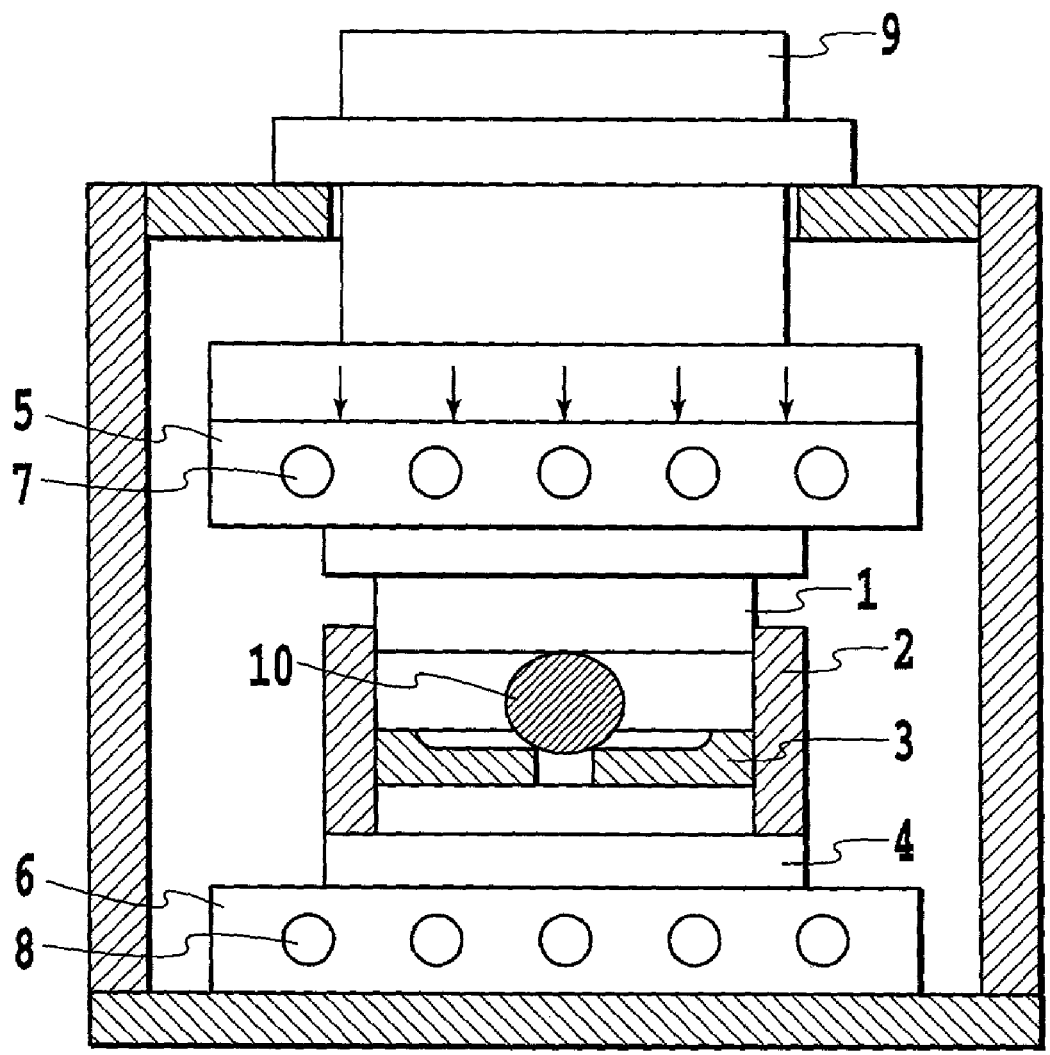
FIG. 31 is an illustration showing a construction of the device in the sixth embodiment of the present invention.
Figure 32:
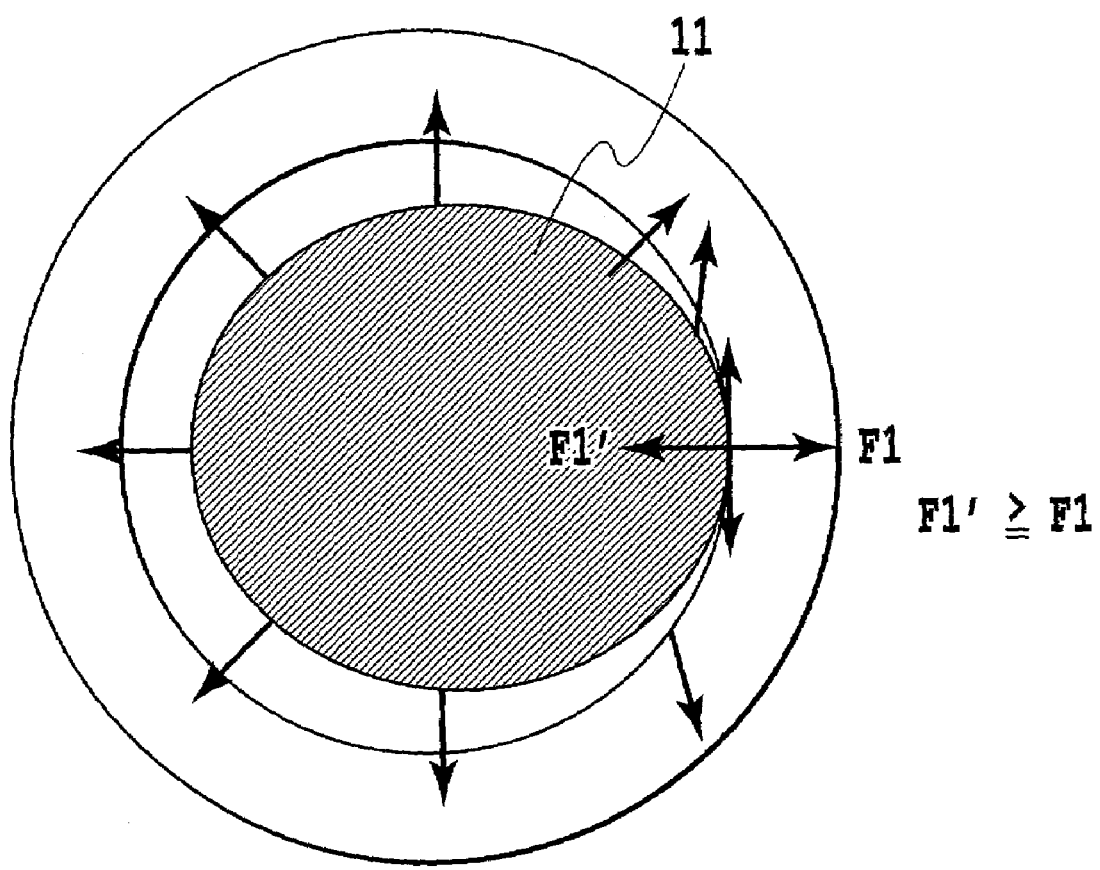
FIG. 32 is an illustration showing a force to be exerted on the molded product during press molding in the sixth embodiment of the present invention.
Figure 33:
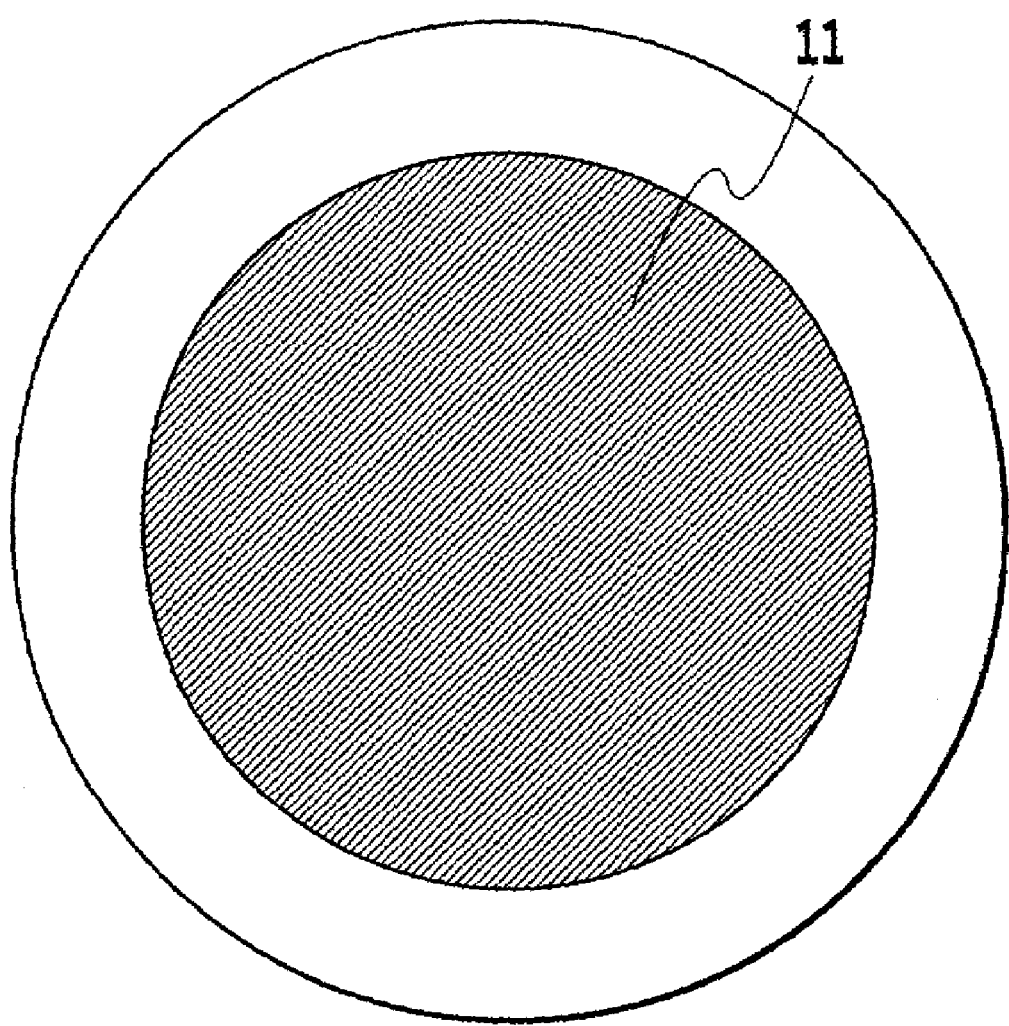
FIG. 33 is an illustration showing a condition where molding is completed in FIG. 32.

FIGS. 29 and 30 show construction of the die of the sixth embodiment of the present invention, and FIGS. 31 to 33 are explanatory illustrations.

In the shown embodiment, in FIGS. 29 and 30, the reference numeral 1 denotes the upper die for press molding the upper surface of the disk, and the molding surface is flat. The reference numeral 3 denotes the intermediate die for press molding the lower surface of the disk portion and the shape of the shaft portion. The intermediate die 3 is provided the recess treatment equal to the lower surface of the disk portion at the center thereof. The surface of the recess portion is flat. On the other hand, at the center of the intermediate die 3, the shaft forming hole portion is processed for forming the shaft portion of the disk coaxially with the recess. The reference numeral 4 denotes the lower die for forming the lower surface of the shaft shaped portion. The molding surface of the lower die 4 is flat. On the other hand, the reference numeral 2 denotes a guide member for restricting the height of the disk. The guide member 2 is a hollow ring shape and clamps the intermediate die 3. The flange portions of the upper die 1 and the lower die 4 abut on the guide member 2 for restricting dimension in the height direction.

At this time, a height h2 of the guide member 2 is expressed by:

$h2=h1+h4+H$ a height h3 of the intermediate die 3 is expressed by:

$h3<H, H-h3\ t/2$

It should be noted that H is a total thickness of the disk with the shaft shaped portion and t is a thickness of the disk portion of the disk with the shaft shaped portion.

As set forth above, by restricting the height of the guide member 2 and the intermediate die 3, the molded product 11 shown in FIG. 30 is molded by surface tension of the glass material.

Press molding is implemented under the similar condition as the fourth embodiment.

The press molding process will be explained with reference to FIG. 31.

At first, the intermediate die 3 is mounted on the lower die 4, and the guide member 2 is mounted on the lower die 4 surrounding the intermediate die 3. The spherical glass material 10 of mass weight (528.25 mg) equal to the mass weight of the molded product is placed on the shaft forming hole portion of the intermediate die 3. Then, the upper die 1 is placed on the glass material 10. At this time, the guide member 2 also serves as guide of the upper die 1. Thus the press die is placed on the stage 6. Thereafter, the stage 5 is lowered until it abuts against the upper die 1 to apply a load of 50 kgf to clamp the press die with the stages 5 and 6. Thereafter, the temperature of the stages are elevated up to 600° C. by the heaters 7 and 8 for heating respective dies and glass material 10 up to 600° C. close to glass softening point. After holding the stages 5 and 6 for 5 minutes after reaching 600° C., the load is increased up to 5000 kgf by the press 9 over 3 minutes to apply pressure to the press die for press molding.

By the die construction of the sixth embodiment, when the glass contacts with the side surface in the recess portion of the intermediate die 3, a reactive force F1' acts. Further spreading of the glass material in the direction where glass contacts with the side surface of the recess portion, is blocked. Then, the glass spreads in the direction where the glass does not yet contact with the inner side surface portion of the intermediate die 3. Finally, the glass spreads over the entire recess portion of the intermediate die 3 as shown in FIG. 33 to determine the shape of the molded product 11.

The obtained disk with the shaft shaped portion was molded into the shape precisely corresponding to the die similarly to the fourth embodiment, and did not have the dent in the shaft portion due to residual air. Also, even in the disk portion, the dent due to residual air did not appear. Then, the disk with the shaft shaped portion having target dimensions of external diameter of 25.4 mm and thickness of 0.38 mm in the disk portion and of diameter of 4.0 mm and length 1.5 mm of the shaft shaped portion can be obtained.

On the other hand, the surface roughness of the press surface of the upper die is transferred precisely so that the surface roughness Ra of the information recording surface of the disk portion was 0.5 nm. The circularity was 10 $\mu$m which is improved from the fifth embodiment and falling within the targeted 30 $\mu$m. On the other hand, the flatness of the disk portion was 1 $\mu$m falling within the targeted 2 $\mu$m.

Furthermore, the concentricity between the disk portion and the shaft portion was 1 $\mu$m smaller than the targeted 2 $\mu$m. Thus, the motor shaft falling within the target dimension could be obtained.

When the recess portion corresponding to the disk portion is not formed in the intermediate die of the shown embodiment, if parallelism of the upper die 1, the intermediate die 3 and the lower die 4 is destroyed due to allowance in engagement between the upper die 1 and the guide member 2, fluctuation of parallelism of the stages 5 and 6 and other reason, circularity of the molded product 11 is degraded during press molding operation as shown in FIG. 32 and localization of spreading direction is cased to limit improvement of circularity of the disk portion.

In the shown embodiment, the outer periphery of the molded product 11 is restricted by the recess portion of the intermediate die to permit further improvement of circularity. On the other hand, because of restriction by the shaft portion and the shaft shaped portion of the intermediate die, concentricity between the disk portion and the shaft portion is also improved.

(Seventh Embodiment)

Figure 34:
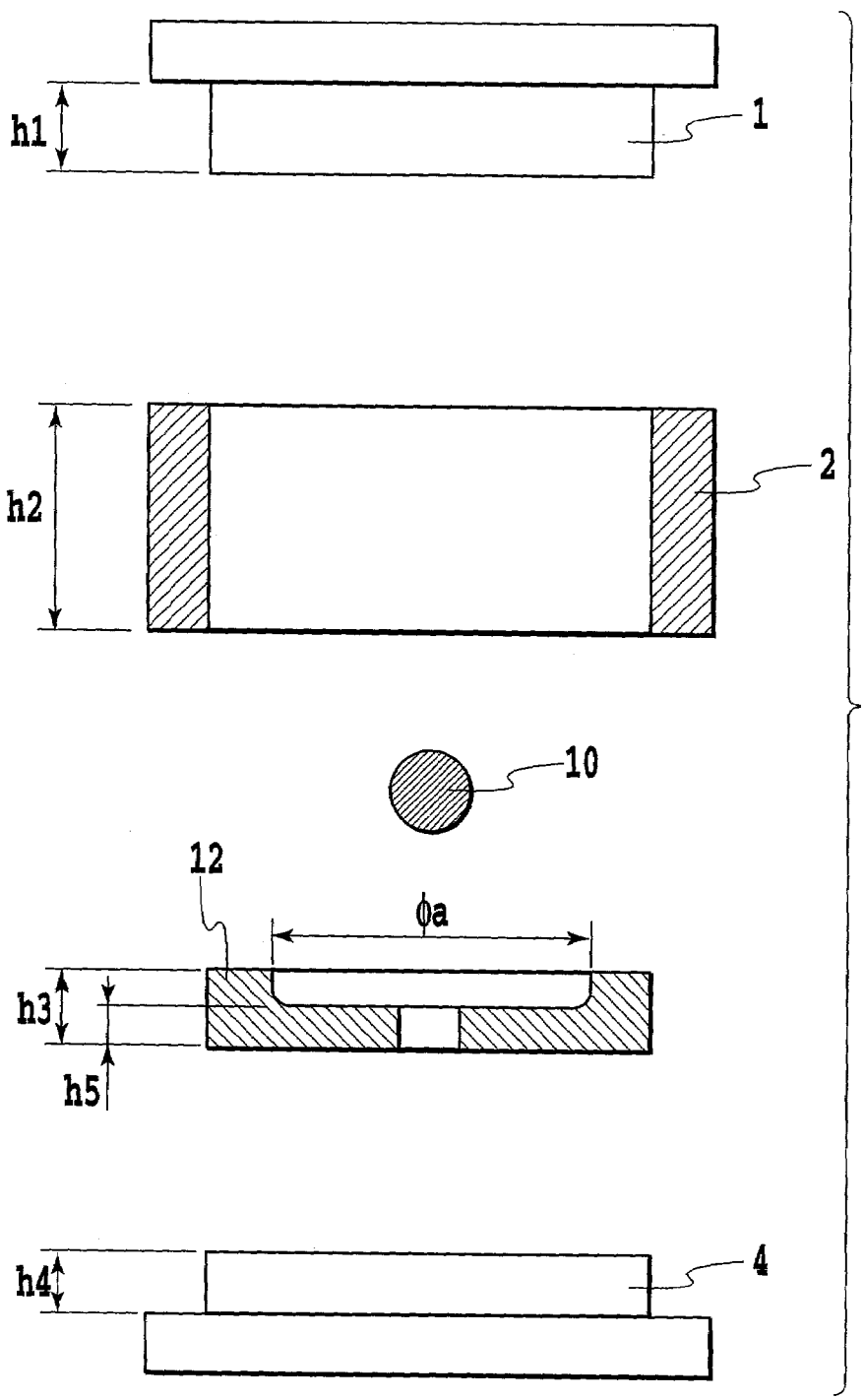
FIG. 34 is a section of the die in the exploded condition in the seventh embodiment of the present invention.
Figure 35:
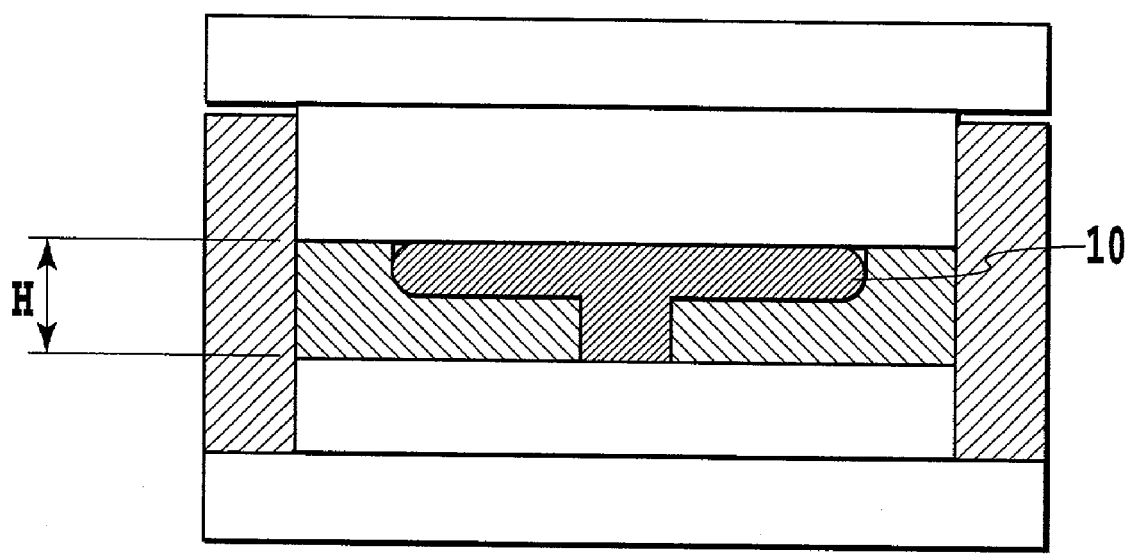
FIG. 35 is a section of the die in the assembled condition in the seventh embodiment of the present invention.

FIGS. 34 and 35 show the seventh embodiment of the present invention.

As shown in FIGS. 34 and 35, the construction of the press die for performing press molding is similar to the sixth embodiment, and the molding process is also similar to the sixth embodiment. Dimensions of the heights of the guide member 2 and the intermediate die 12 are as follows:

The height h2 of the guide member 2 is expressed as follow:

$$h2 < h1 + h4 + H$$

The height h3 of the intermediate die 12 is as follow:

$$h3 = H$$

It should be noted that H is a total thickness of the disk with the shaft shaped portion and t is a thickness of the disk portion of the disk with the shaft shaped portion.

By this, as shown in FIG. 35, the guide member 2 performs only guiding of the upper die 1, the intermediate die 3 and the lower die 4 upon press molding and does not contact with the flange portion of the upper die 1. Then, the upper die 1 abuts with the intermediate die 3 to determine the dimension of the molding product 11 in height direction.

Press molding operation wad performed under similar condition as the sixth embodiment.

In the shown embodiment, the outer periphery of the molding product 11 is restricted by the recess portion of the intermediate die 3, and the shaft portion is also restricted by the shaft shaped portion of the intermediate die. Therefore, circularity of the disk portion and concentricity between the disk portion and the shaft portion can certainly be achieved. Also, with the dimension of the intermediate die 3 in the height direction, dimension of the molded product in the height direction can be determined.

The obtained disk with the shaft shaped portion was molded into the shape precisely corresponding to the die similarly to the fourth embodiment, and did not have the dent in the shaft portion due to residual air. Also, even in the disk portion, the dent due to residual air did not appear. Then, the disk with the shaft shaped portion having target dimensions of external diameter of 25.4 mm and thickness of 0.38 mm in the disk portion and of diameter of 4.0 mm and length 1.50 mm of the shaft shaped portion can be obtained.

On the other hand, the surface roughness of the press surface of the upper die is transferred precisely so that the surface roughness Ra of the information recording surface of the disk portion was 0.5 nm. The circularity was 10 μm which is improved from the fifth embodiment and falling within the targeted 30 μm. On the other hand, the flatness of the disk portion was 1 μm falling within the targeted 2 μm.

Furthermore, the concentricity between the disk portion and the shaft portion was 1 μm smaller than the targeted 2 μm. Thus, the motor shaft falling within the target dimension could be obtained.

(Eighth Embodiment)

Figure 36:
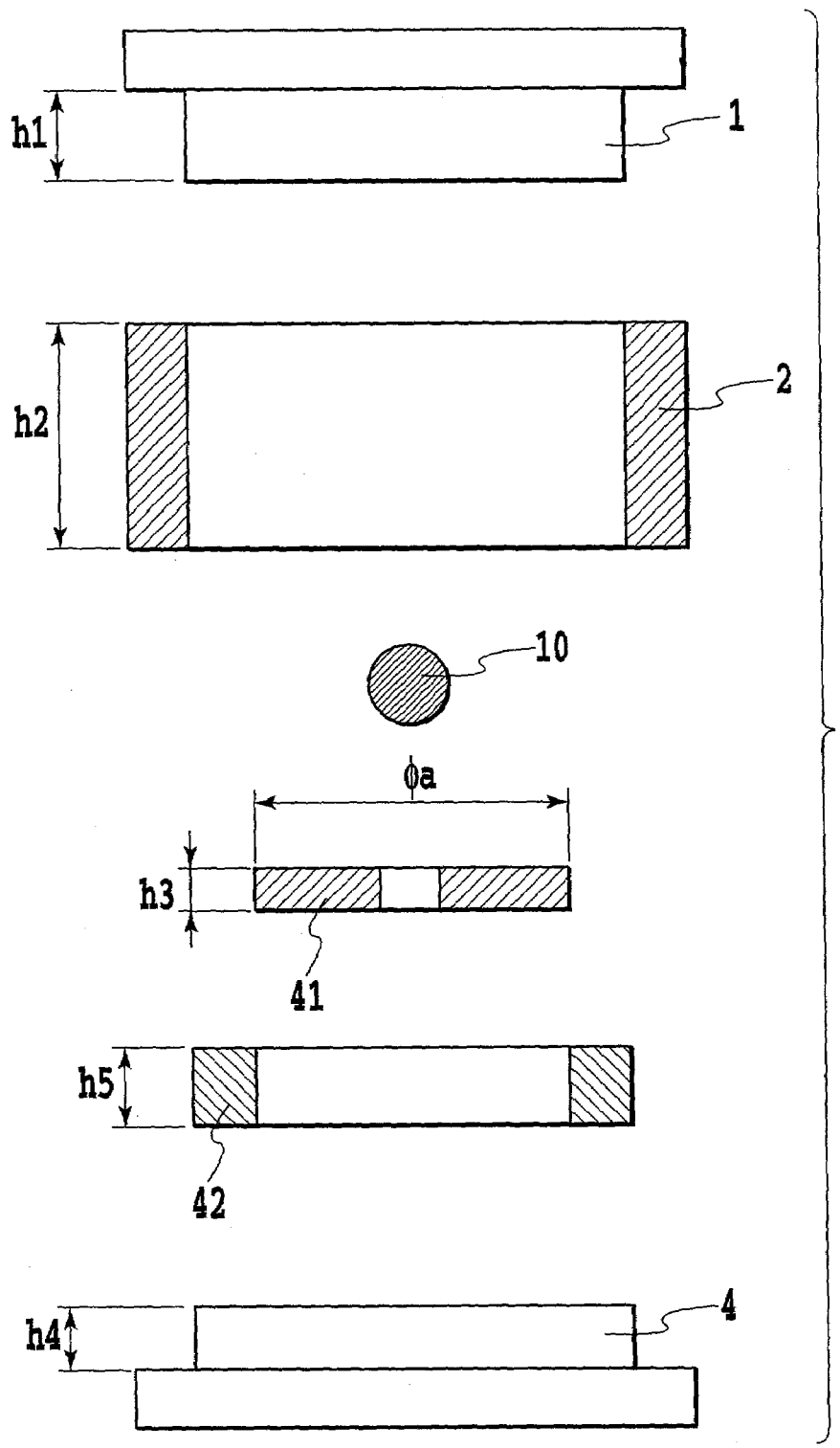
FIG. 36 is a section of the die in the exploded condition in the eighth embodiment of the present invention.
Figure 37:
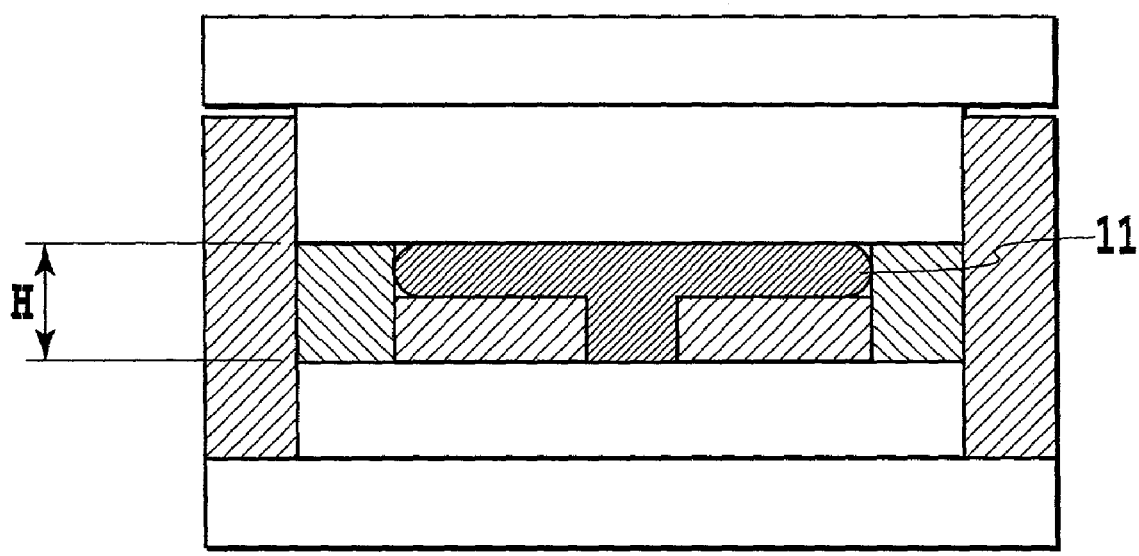
FIG. 37 is a section of the die in the assembled condition in the eighth embodiment of the present invention.
Figure 38:
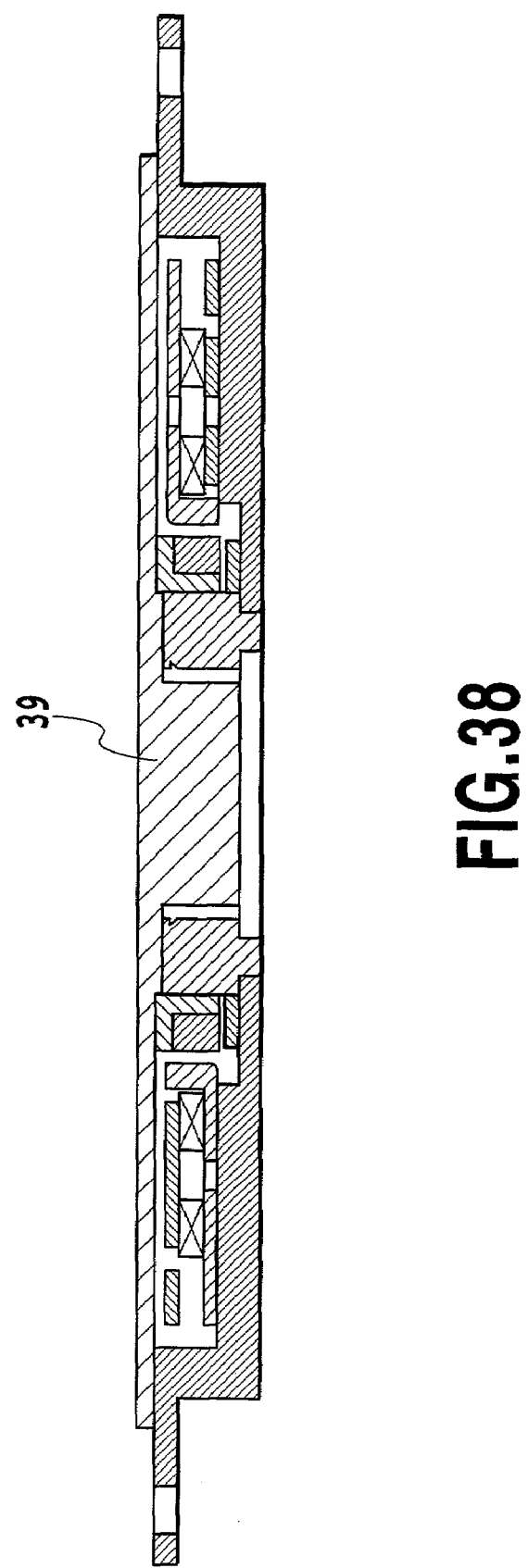
FIG. 38 is a diagrammatic section of a disk integrated type motor using a disk with a shaft shaped portion of the present invention.
Figure 39:
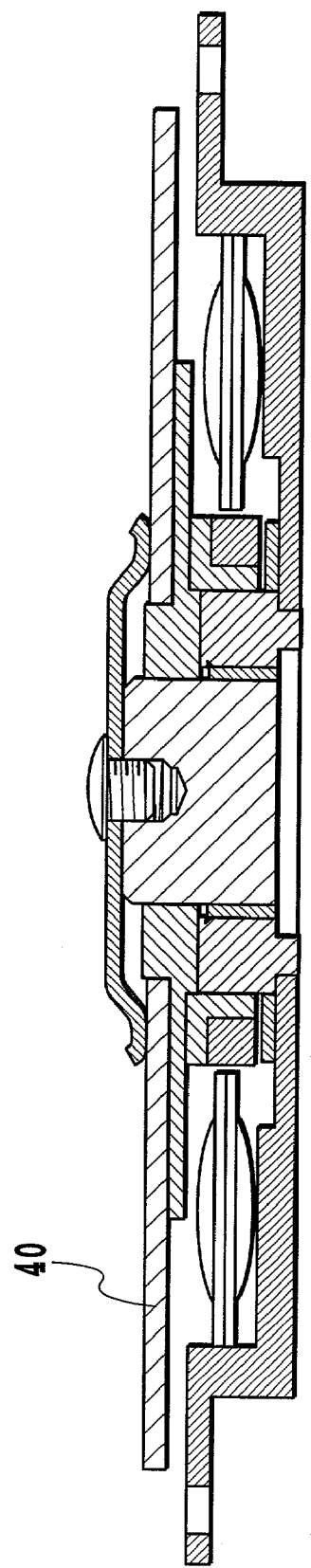
FIG. 39 is a diagrammatic section of a motor portion in the case where the conventional donut type disk is used.
Figure 40:
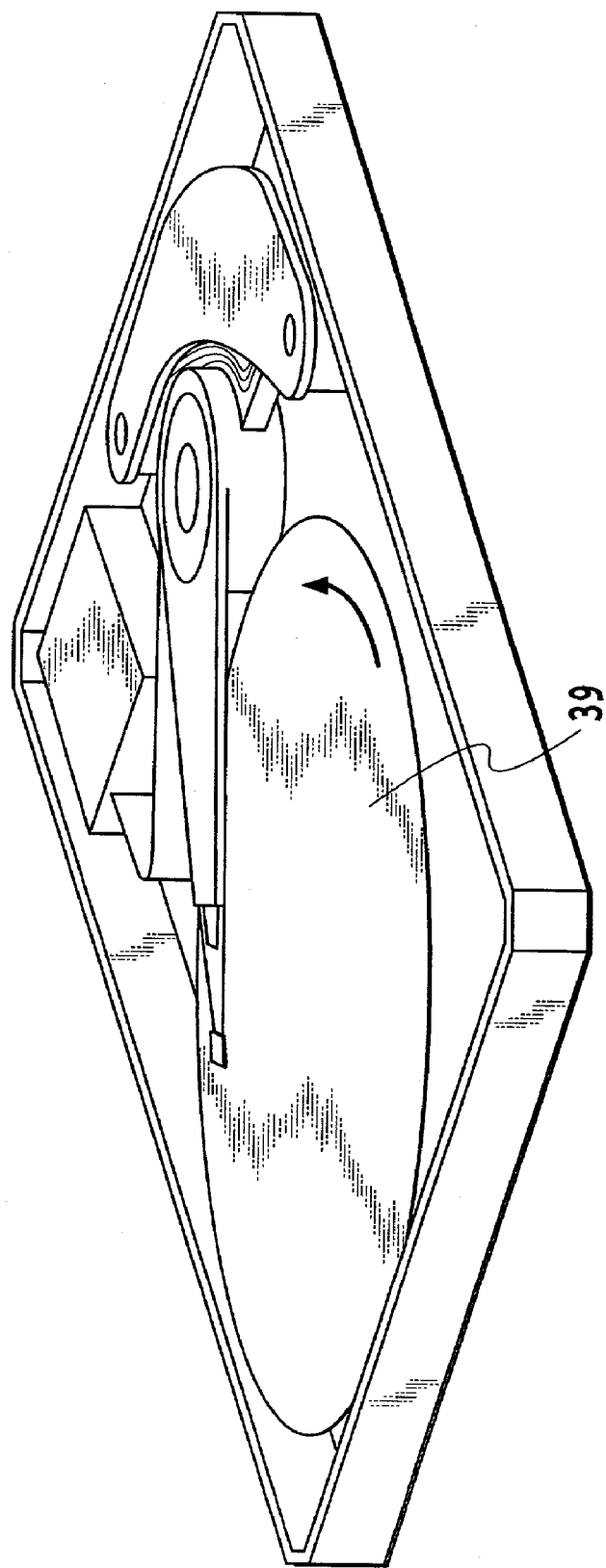
FIG. 40 is a perspective view of a disk drive unit assembled therein a disk integrated type motor of FIG. 38.

FIGS. 36 and 37 show the eighth embodiment of the present invention.

As shown in FIG. 36, construction of the press die for performing press molding is substantially similar to the seventh embodiment and the molding process is also similar to the seventh embodiment. Comparing with the intermediate die 12 in the seventh embodiment, the intermediate die is divided into an outer frame and a bottom frame. A diameter of the bottom frame is determined to be equal to a diameter øa of the disk. The intermediate die is constructed with the bottom frame 13 having height dimension determined to be equal to the height of the shaft shaped portion of the molded product, and the outer frame 14 (h5=H) determining the height dimension to be equal to the height of the molding product.

The press molding is implemented in similar condition as the sixth embodiment.

In the shown embodiment, by dividing construction of the intermediate die, machining of the recess becomes unnecessary to require only machining for smoothing of plane, formation hole and processing of the outer periphery. Therefore, process becomes easy and required precision can be achieved.

The obtained disk with the shaft shaped portion was molded into the shape precisely corresponding to the die similarly to the fourth embodiment, and did not have the dent in the shaft portion due to residual air. Also, even in the disk portion, the dent due to residual air did not appear. Then, the disk with the shaft shaped portion having target dimensions of external diameter of 25.4 mm and thickness of 0.38 mm in the disk portion and of diameter of 4.0 mm and length 1.5 mm of the shaft shaped portion can be obtained.

On the other hand, the surface roughness of the press surface of the upper die is transferred precisely so that the surface roughness Ra of the information recording surface of the disk portion was 0.5 nm. The circularity was 10 μm which is improved from the fifth embodiment and falling within the targeted 30 μm. On the other hand, the flatness of the disk portion was 1 μm falling within the targeted 2 μm.

Furthermore, the concentricity between the disk portion and the shaft portion was 1 μm smaller than the targeted 2 μm. Thus, the motor shaft falling within the target dimension could be obtained.

(Ninth Embodiment)

Figure 10:
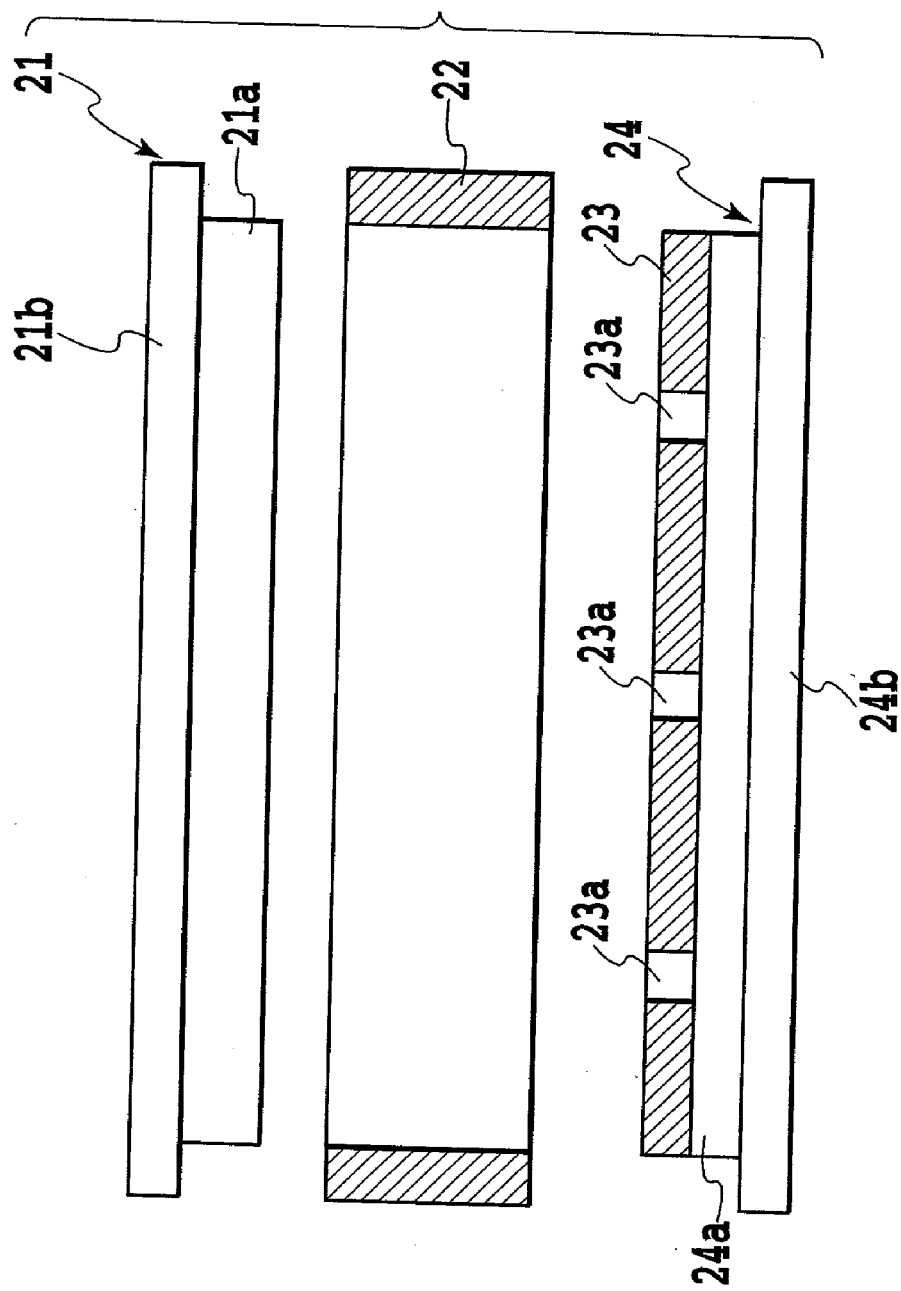
FIG. 10 is an exploded general section showing the press die in the ninth embodiment of the present invention.
Figure 11:
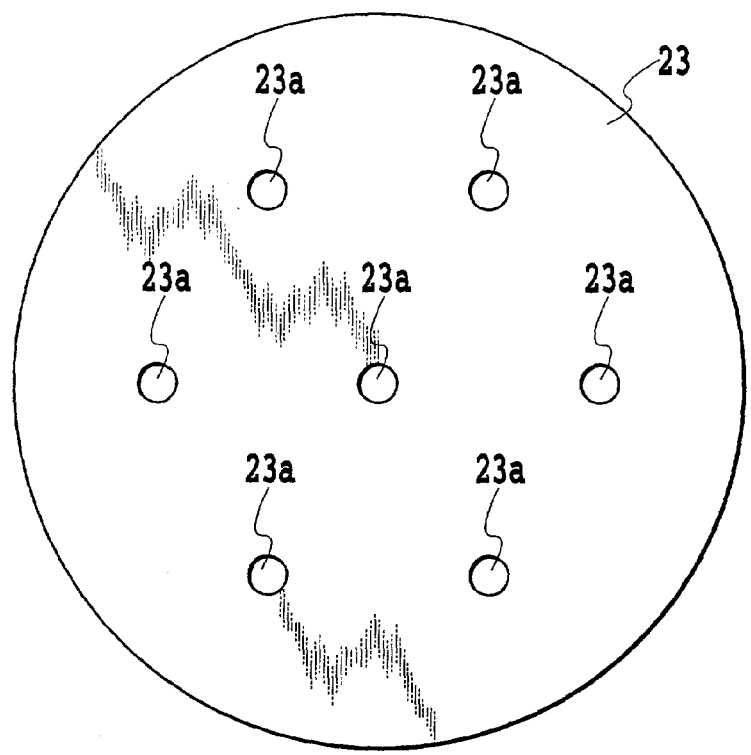
FIG. 11 is a plan view of an intermediate die of the press die of FIG. 10.
Figure 12:
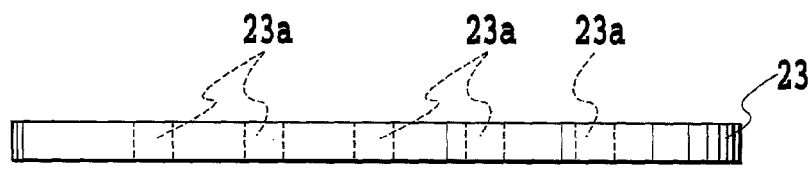
FIG. 12 is a front elevation of the intermediate die of the press die of FIG. 11.
Figure 13:
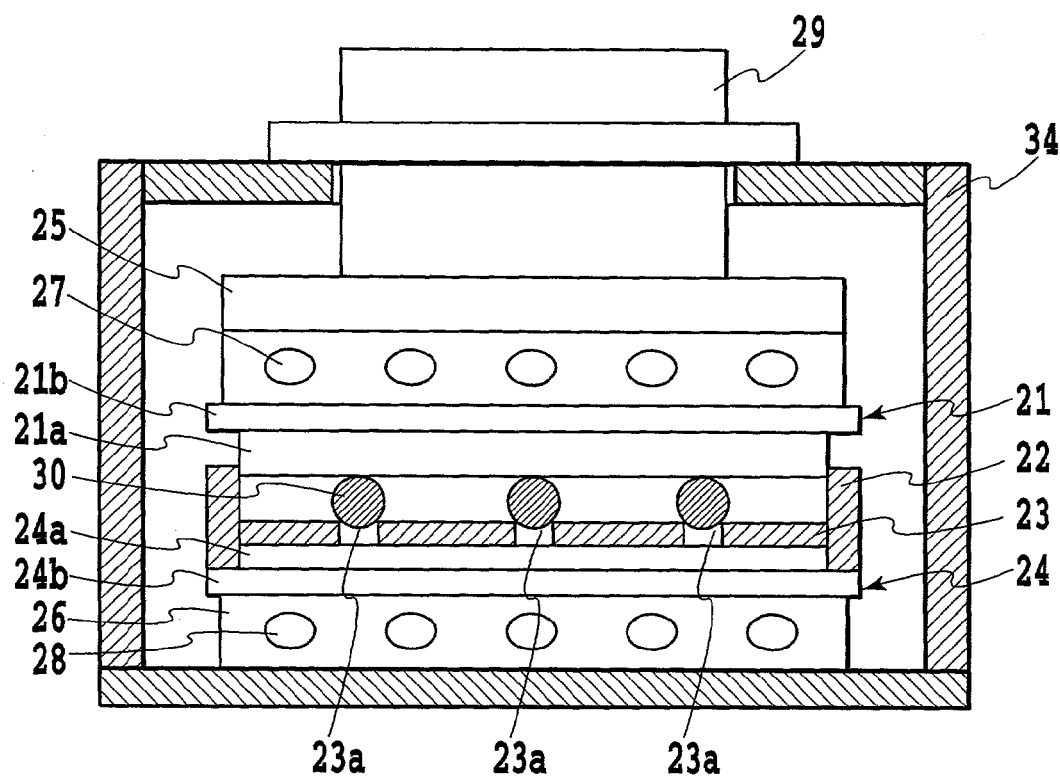
FIG. 13 is a section of the press die for performing molding employing a press die of FIG. 10 for implementing the molding process of the ninth embodiment of the present invention.
Figure 14:
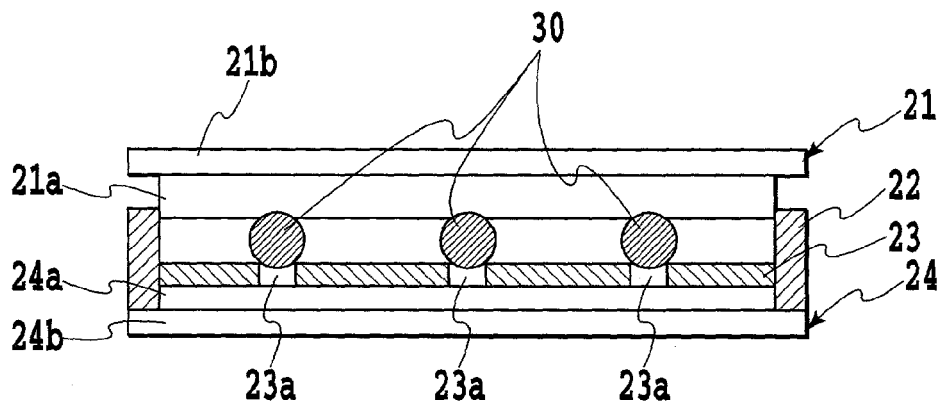
FIG. 14 is a partial section at an initial stage of molding of the press die portion of FIG. 13.

FIG. 10 is an exploded general section showing the press die in the ninth embodiment of the present invention, and FIGS. 11 to 15 are explanatory illustrations of the molding process.

As shown in FIGS. 10 to 13, the press die for implementing the ninth embodiment of the molding process according to the present invention is constructed with an upper die 21 having a pushing portion 21a and a flange portion 21b, a cylindrical height restricting plate 22 serving as height restricting member for restricting height of the die, an intermediate die 23 provided with a plurality of shaft forming hole portions 23a for forming shaft shaped portions 32 of a molded product 31, and a lower die 24 formed with a pushing portion 24a and a flange portion 24b.

In the ninth embodiment of the press die according to the present invention, the upper die 21 and the lower die 24 have protective film consisted of noble metal alloy on the surface of hard metal having a press portion of 110 mm diameter. The surfaces of the upper die 21 and the lower die 24 have surface roughness Ra of 0.5 nm and flatness of 0.5 μm. The upper die 21 and the lower die 24 are designed for forming an upper surface of a disk member 33 and a lower surface of the shaft shaped portion 32 of the molded product 31. Upper die 21 and lower die 24 are convex shapes respectively including the pushing portions 21a and 24a with flat molding surfaces and flange portions 21b and 24b having slightly greater dimension than the pushing portions 21a and 24a. On the other hand, the height restricting plate 22 (dimension: 26.880 mm) is a cylindrical member for restricting height, namely the thickness of the disk member 33 of the molded product 31. The height restricting plate 22 is a hollow ring shape and clamps the intermediate die 23. By abutting the upper and lower end of the height restricting plate 22 on the flange portions 21b and 24b of the upper die 21 and the lower die 24, movement of the press dies in the height direction is restricted. Therefore, by the height restricting plate 22, the thickness of the disk member 33 of the molded product 31 is defined.

On the other hand, the intermediate die 23 is constructed with one die plate formed with a plurality of shaft forming hole portions 23a (diameter: 4.0 mm) formed as through holes in a manner not interfering with each other. In the shown embodiment, at the center of the intermediate die 23, one shaft forming hole portion 23a is provided. Around the shaft forming hole portion 23a at the center, six shaft forming hole portions 23a are arranged in regular hexagonal shape (interval: 35.4 mm).

Of course, number and arrangement of the shaft forming hole portions are not limited to these 7 shaft forming hole portions 23a in total arranged at regular hexagonal shape. Therefore, number of arrangement of the shaft forming hole portions may be selected arbitrary.

In the press die of the present invention, for press molding the disk, at first, the intermediate die 23 is mounted on the lower die 24 and the height restricting plate 22 for restricting height surrounding the lower die 24 and the intermediate die 23. Next, spherical glass materials 30 each having mass weight preliminarily adjusted to be equal to the mass weight (528.25 mg) of the final shape of the disk member 17 of the molded product, are placed on a plurality of shaft forming hole portions arranged in the intermediate die 23. Furthermore, the upper die 21 is disposed thereon. Accordingly, at this time, the height restricting plate 22 also serves as guide for the upper die 21.

Thus the set of press die is placed on a stage 26, and a stage 25 is lowered until it abuts to the upper die 21. Then, a load of 150 kgf is applied to clamp the press die by these stages 25 and 26.

Subsequently, temperatures of the stages 25 and 26 are elevated by heaters 27 and 28 to heat the upper die 21, the intermediate die 23, the lower die 24 of the press die up to 600° C. near softening point for forming the glass material 30. After reaching 600° C., the press die is maintained in thus clamped condition for 8 minutes. Then, the load is increased to 30000 kgf over 3 minutes by the press 9 to pressurize the press die to performing press molding.

At this time, gas enclosed in respective shaft forming hole portions 23a of the intermediate die 23 and the glass material 30 is compressed by penetration of the glass material 30 into respective shaft forming hole portions 23a and is discharged through a gap between the intermediate die 23 and the lower die 24. Thus, the glass material 30 can be distributed into respective shaft forming hole portions 23a. The glass material 30 has high viscosity and thus does not penetrate into the gap between the intermediate die 23 and the lower die 24 and is uniformly compressed by the press 29 through the upper die 21. Thus, a plurality of molded products 31 are produced by one cycle of molding process.

Subsequently, the heaters 27 and 28 are turned OFF, and the load is lowered down to 7000 kgf. In this condition, the stages 25 and 26, the upper die 21, the intermediate die 23, the lower die 24 and the glass material 30 are cooled down. After cooling the glass material 30 down to 440° C. of strain point temperature of the glass material, the load is further lowered down to 350 kgf. The molded products are removed at a temperature lower than or equal to 100° C.

Figure 15:
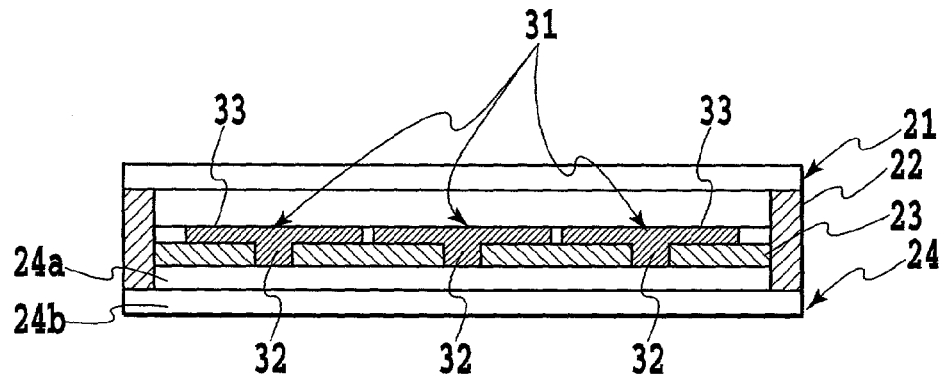
FIG. 15 is a partial section of the molded product portion of the press die of FIG. 14.
Figure 16:
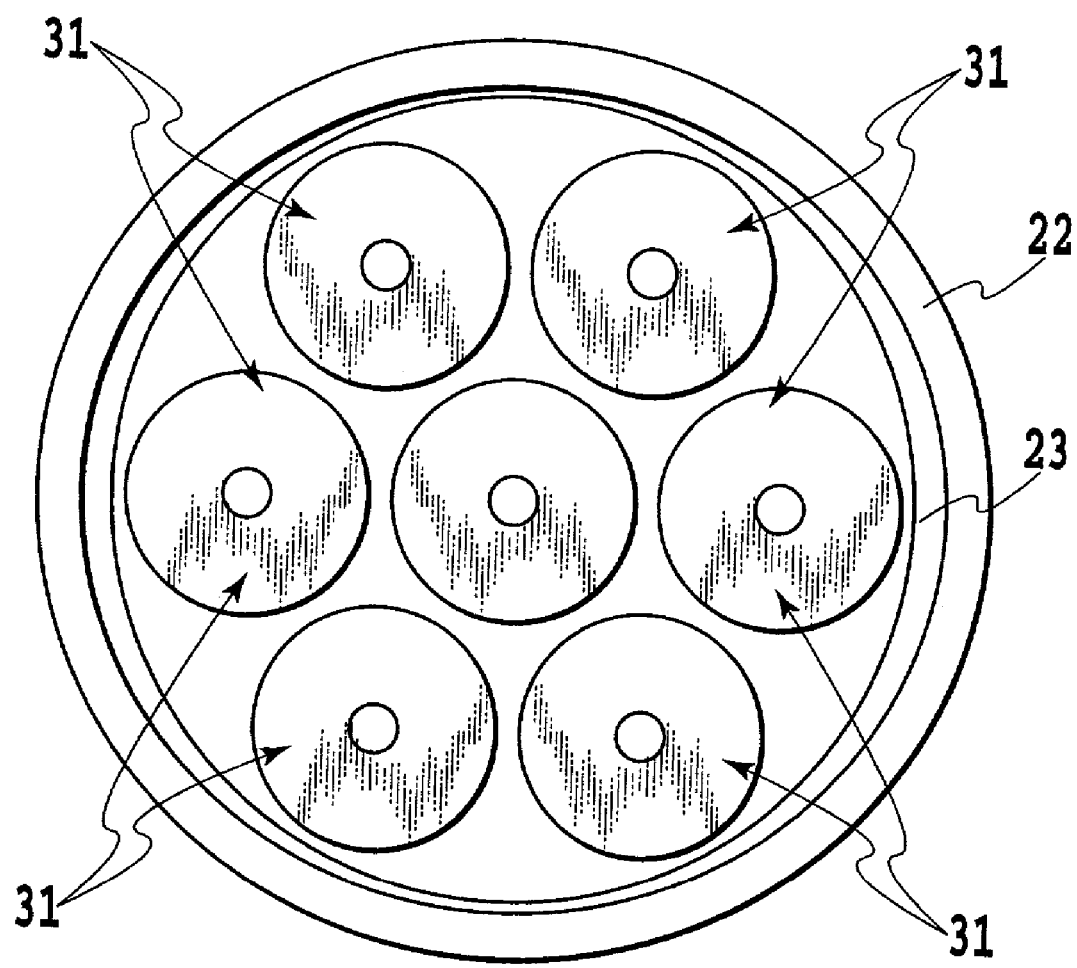
FIG. 16 is a partial plan view of the molded product portion of the press die of FIG. 15.
Figure 17:
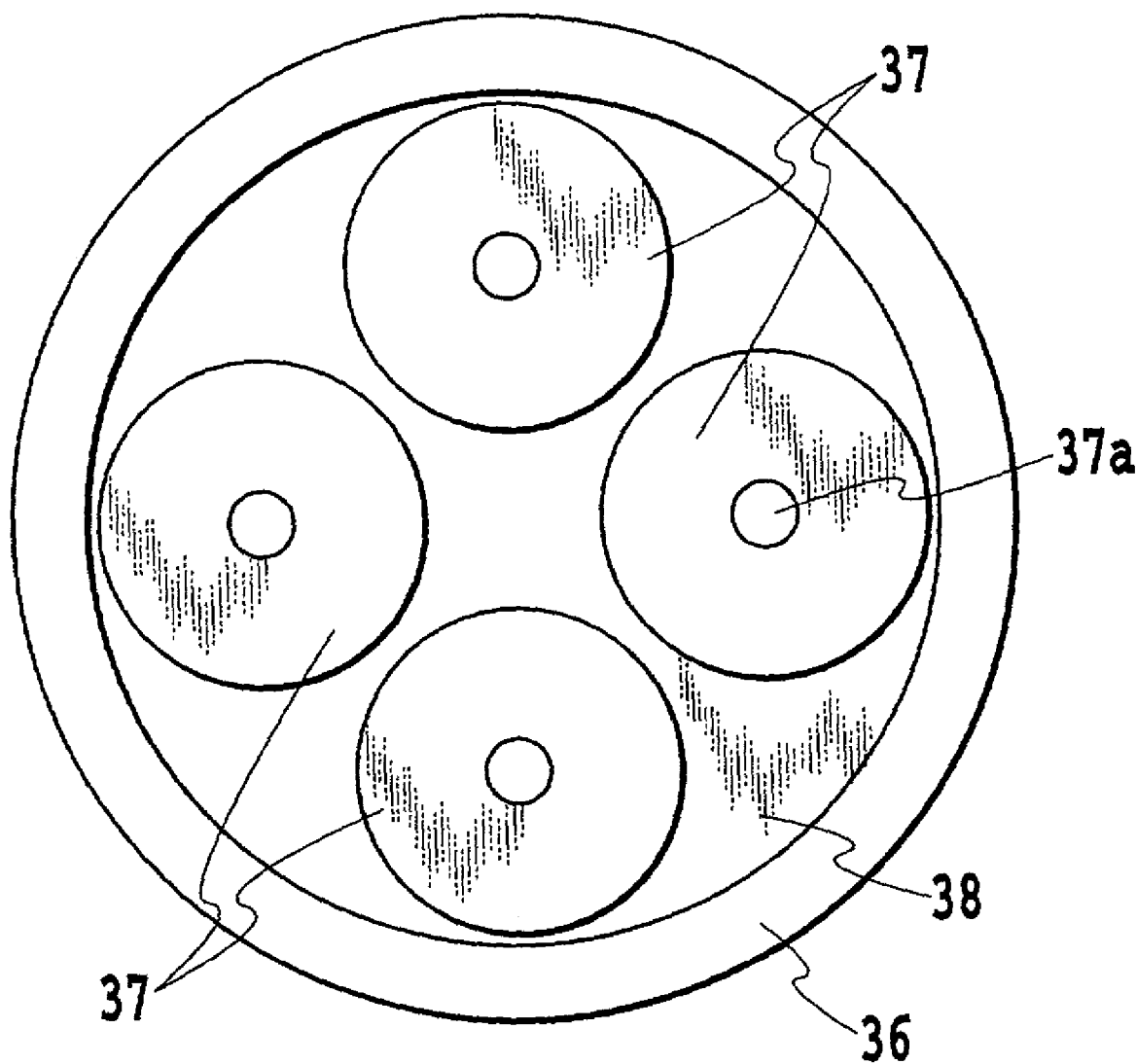
FIG. 17 is a plan view of the press die for performing molding employing a press die for implementing the molding process of the tenth embodiment of the present invention.
Figure 18:
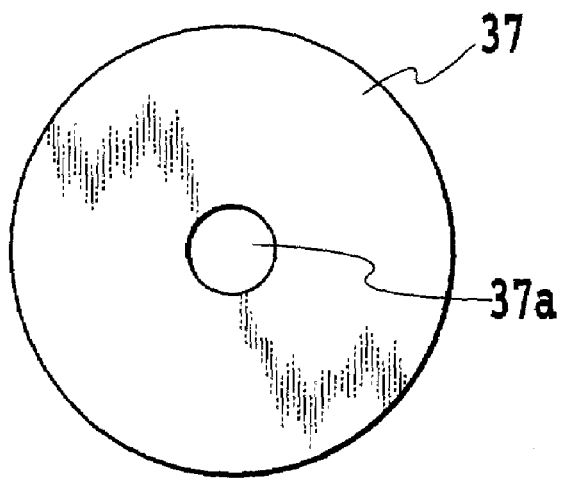
FIG. 18 is a bottom view of the molded product of FIG. 17.
Figure 19:
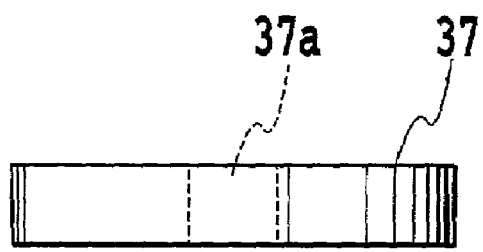
FIG. 19 is a front elevation of the molded product of FIG. 17.

By the foregoing molding process, the glass material 30 can be molded into shape as set on the press die as the molding product 31 shown in FIGS. 15 and 16 and did not have the dent in the shaft portion due to residual air. Also, even in the disk portion, the dent due to residual air did not appear. On the other hand, the surface roughness of the press surface of the upper die is transferred precisely so that the surface roughness Ra of the information recording surface of the disk portion was 0.5 nm. The circularity was 25 $\mu$m falling within the targeted 30 $\mu$m. On the other hand, the flatness of the disk portion was 1.5 $\mu$m falling within the targeted 2 $\mu$m. Furthermore, the concentricity between the disk portion and the shaft portion was 1 $\mu$m smaller than the targeted 2 $\mu$m. Thus, the motor shaft falling within the target dimension could be obtained.

As can be seen from the foregoing, since the press die for implementing the molding process of the disk with the shaft shaped portion according to the present invention is constructed with the upper die 21, the intermediate die 23 and the lower die 24, residing of gas, such as air, in the tip end portion of the shaft forming hole portions 23 of the intermediate die 23 can be prevented. Also, a plurality of molded products 31 can be formed through one molding process with shaping the glass material 30 into the shaft precisely corresponding to the press die. Also, the tip end portion of the shaft shaped portion 32 of the molded product 31 can be formed satisfactorily to produce a large amount of disks.

(Tenth Embodiment)

Figure 20:
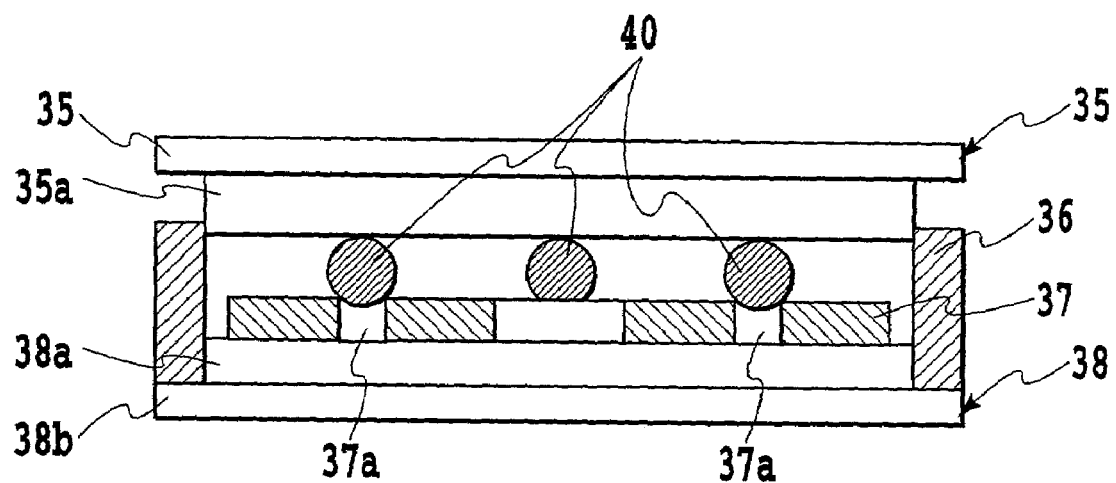
FIG. 20 is a section of the press die for performing molding by means of the press die for implementing the molding process of the tenth embodiment of the present invention illustrated in FIG. 17.

FIGS. 16 to 21 show the tenth embodiment of the press die for implementing the molding process of the disk with the shaft shaped portion according to the present invention. As shown in FIG. 20, a spherical material 40 is preliminarily finished into substantially spherical shape similarly to the former embodiment, as shown in FIG. 20.

The press die to be used in the tenth embodiment of the present invention is substantially the same as the basic construction as the die to be used in the former ninth embodiment. However, in the shown embodiment, the intermediate die is formed with a plurality of individual die plate so that a plurality of molded products are molded independently by respective intermediate dies. Namely, the press die is constructed with an upper die 35 having the pushing portion 35a and the flange portion 35b, a cylindrical height restricting plate 36 as restricting member for restricting height, an intermediate die 37 (diameter: 30.0 mm) having shaft forming hole portion 37a (diameter: 4.0 mm) at the center, a lower die 38 on which a plurality of intermediate dies 37 are arranged in a manner not interfering with each other. Respective glass materials 40 is placed on the shaft forming hole portion 37a of respective intermediate dies. Accordingly, in the shown embodiment, the intermediate die 37 is formed with a plurality of mutually independent die plates. Each die plates of the intermediate die 37 are separated corresponding to respective molded products 41. This is the different point from the former embodiment.

On the other hand, in the shown embodiment, the intermediate die 37 is formed with four die plates. However, number of die plates for forming the intermediate die is not limited to any specific number but can be chosen as any arbitrary number depending upon capacity of the press die, size of the disk member 37. Furthermore, these plurality of intermediate die plates of the intermediate die 37 are arranged in spaced apart so as not to cause interference with each other.

Molding operation was performed in the shown embodiment under similar condition as the foregoing ninth embodiment.

In the press die having the intermediate die 37 having a plurality of die plates, by preliminarily forming respective glass material into substantially spherical shape for press molding, respective glass materials are to be spread in circular form about the shaft forming hole portion 37a at the center of the respective intermediate die 37 and to be molded into a shaft shaped portion 42 and a disk portion 43 of the molded product 41 by a molding surface of the pushing portion 35a of the upper die 35, the upper surfaces and the shaft forming hole portion 37a of the intermediate die 37. Thus, the a plurality of the disk members 33 and the shaft member 32 with high precision concentricity can be molded as the molded products 41 corresponding to the respective intermediate die 37.

Figure 21:
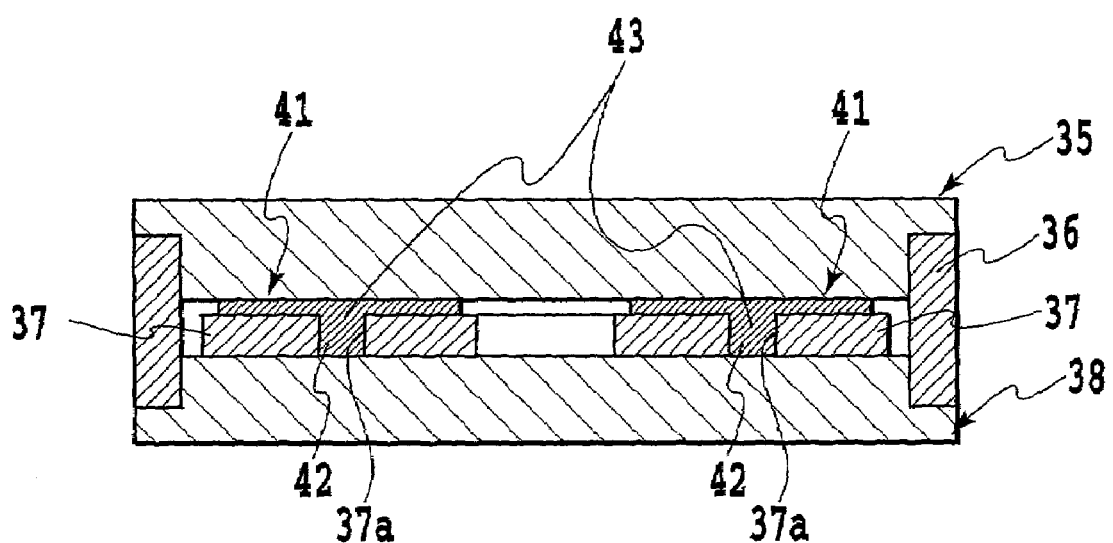
FIG. 21 is a partial section upon molding of the press die portion of FIG. 20.
Figure 22:
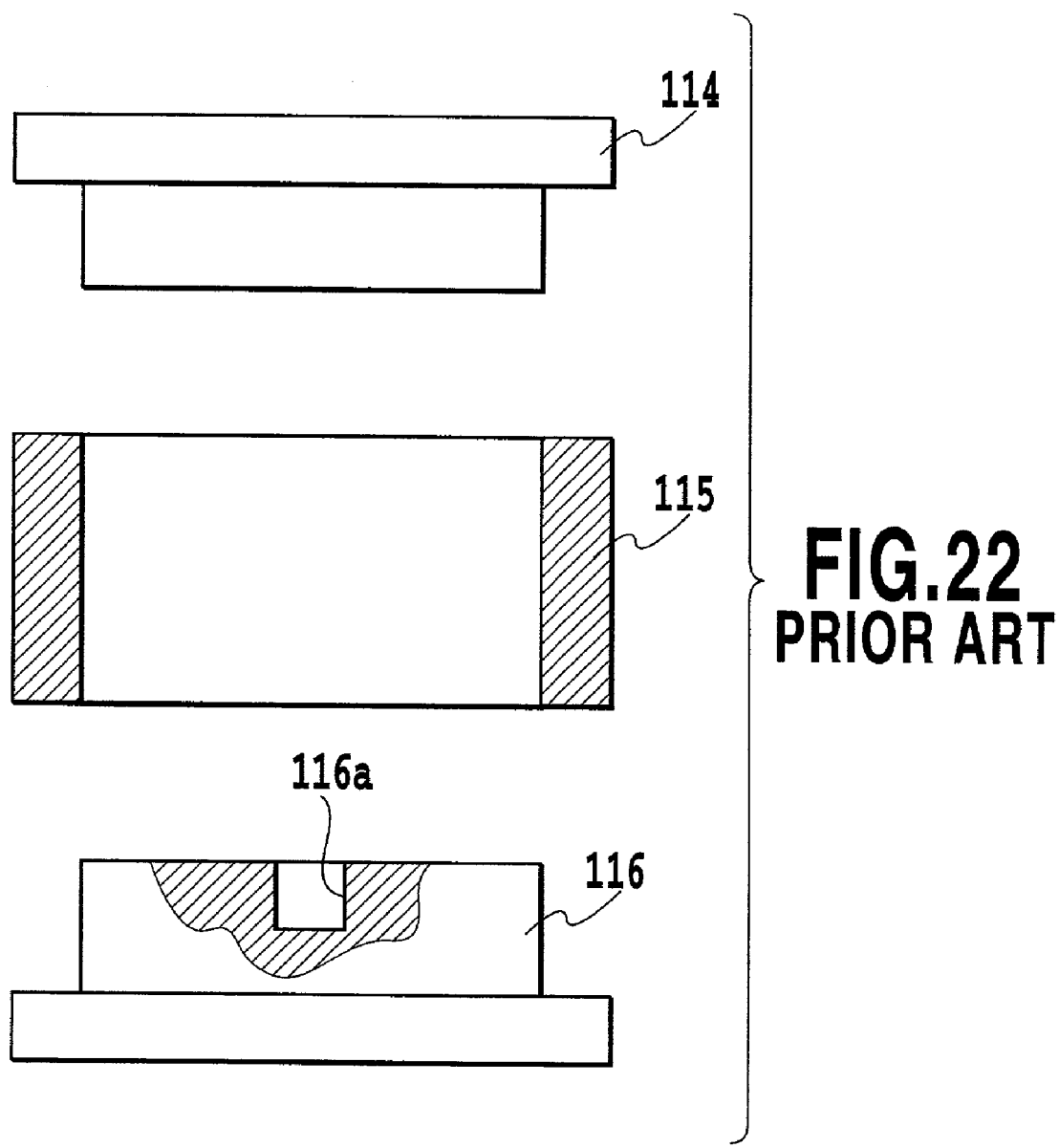
FIG. 22 is an exploded section showing the press die in the prior art.
Figure 23:
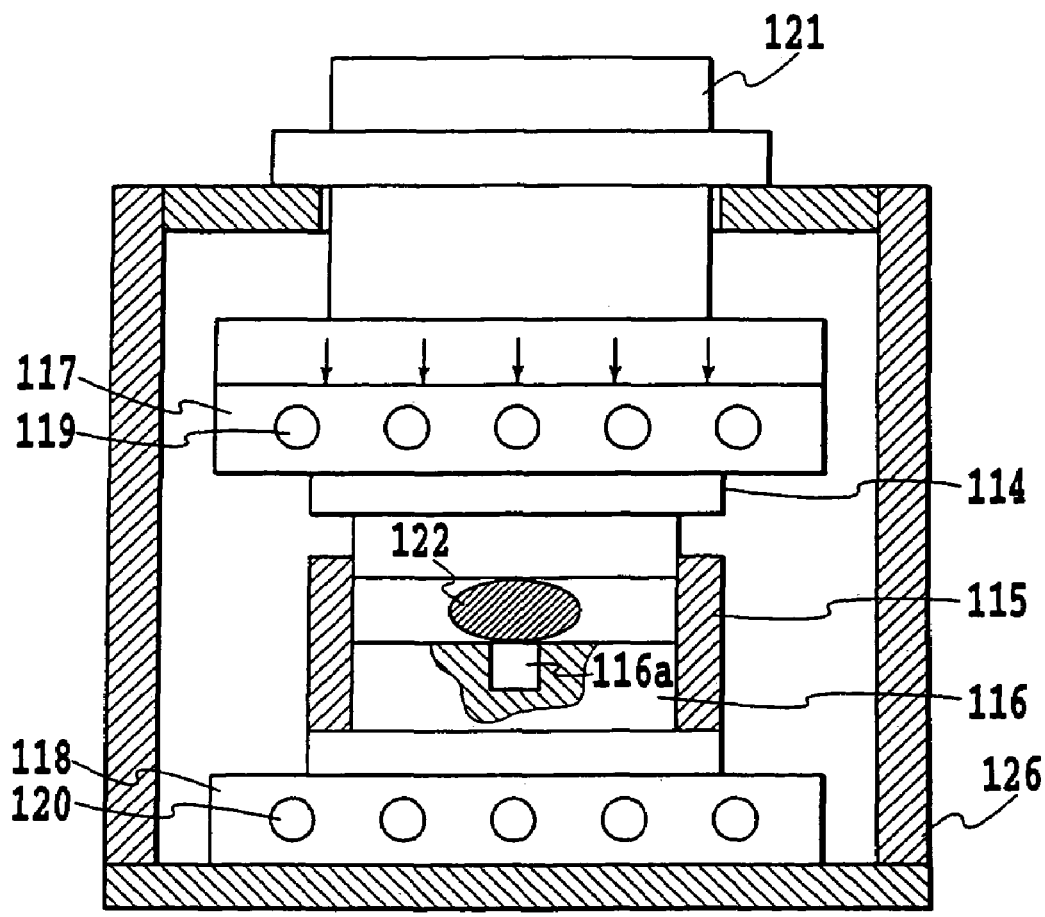
FIG. 23 is a section of the die in the molding process employing the conventional press die of FIG. 22.
Figure 24:
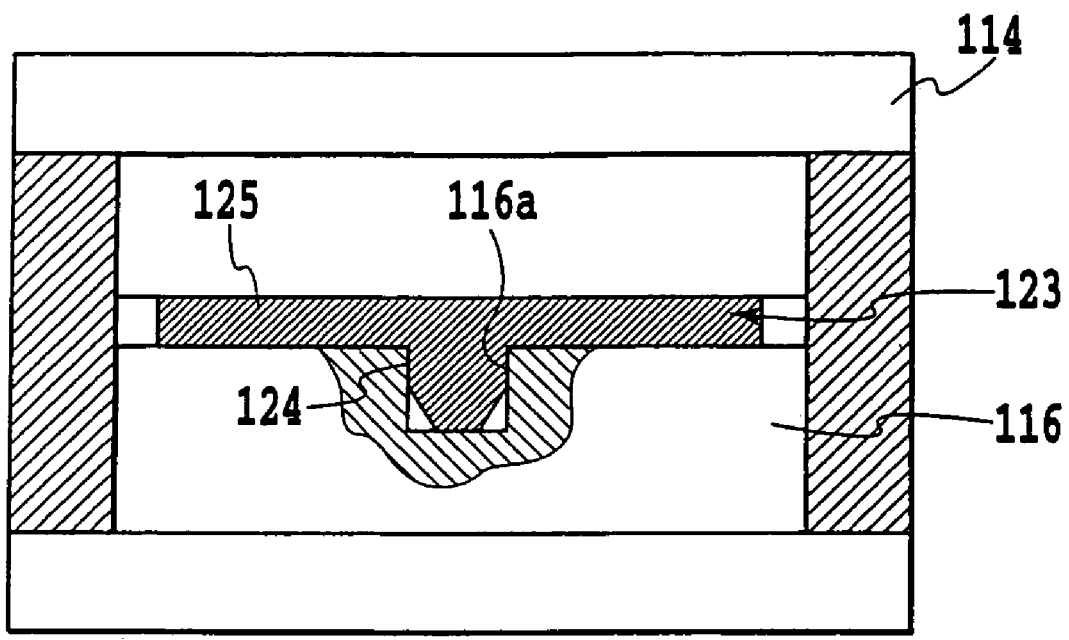
FIG. 24 is a partial section of the die portion corresponding to the molding product portion of FIG. 23.
Figure 25:
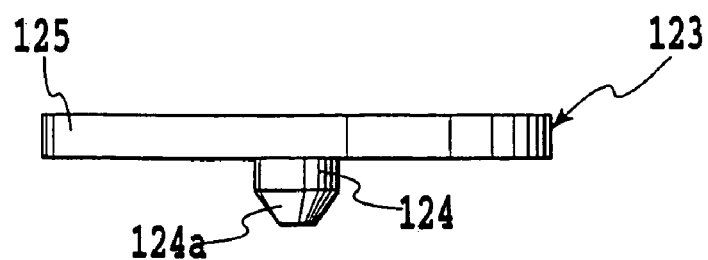
FIG. 25 is a front elevation of the molded product in the prior art of FIG. 23.
Figure 26:
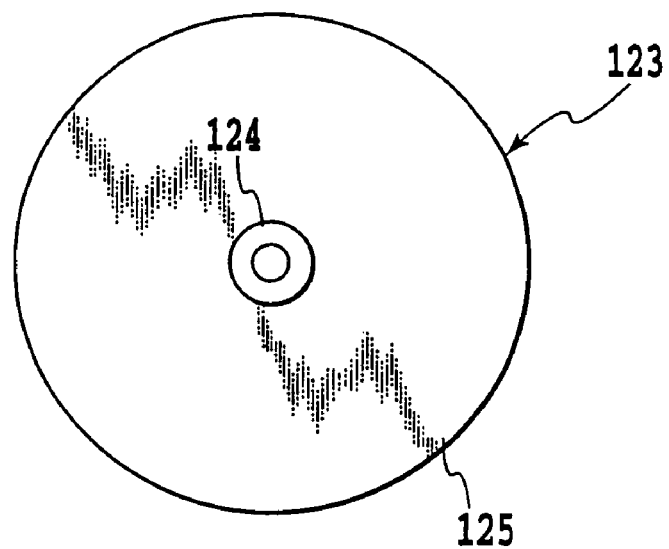
FIG. 26 is a bottom view of the molded product of FIG. 25.

Namely, as shown in FIG. 21, concentricity between the shaft shaped portion 42 and the disk shaped portion 43 of the molded product 41 can be certainly secured. Furthermore, a plurality of molded products 41 can be molded in one cycle of press molding operation simultaneously.

With the foregoing molding process, the glass material 30 is formed into the shape as set in the press die as the molded products 31 shown in FIGS. 15 and 16, and did not have the dent in the shaft portion due to residual air. Also, even in the disk portion, the dent due to residual air did not appear. On the other hand, the surface roughness of the press surface of the upper die is transferred precisely so that the surface roughness Ra of the information recording surface of the disk portion was 0.5 nm. The circularity was 25 $\mu$m falling within the targeted 30 $\mu$m. On the other hand, the flatness of the disk portion was 1.0 $\mu$m falling within the targeted 2 $\mu$m. Furthermore, the concentricity between the disk portion and the shaft portion was 1.0 $\mu$m smaller than the targeted 2 $\mu$m. Thus, the motor shaft falling within the target dimension could be obtained. As can be appreciated from the above, by preliminarily forming the glass material into substantially spherical shape for molding with placing on the through hole 37a of each intermediate die, the optimal concentricity between the shaft shaped portion 42 and the disk member 43 can be certainly attained.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A molding process of a disk with a shaft shaped portion comprising the steps of:
   providing an upper die performing press molding from an upper surface, an intermediate die having a shaft forming hole portion for forming a shaft shaped portion and a lower die for forming a lower surface of said shaft shaped portion, said lower die being separate from said intermediate die, contact surfaces between said intermediate die and said lower die having a surface roughness that permits discharge of gas enclosed in said shaft forming hole portion through a gap between said intermediate die and said lower die;
   placing a glass material of revolving body shape having a circular cross-section in a direction perpendicular to its center axis and including a circular section at least greater than said shaft forming hole portion, on said shaft forming hole portion of said intermediate die; and
   subsequently performing press molding for said glass material.

2. A molding process of a disk with a shaft shaped portion comprising the steps of:
   providing an upper die performing press molding from an upper surface, an intermediate die having a shaft forming hole portion for forming a shaft shaped portion and a lower die for forming a lower surface of said shaft shaped portion, said lower die being separate from said intermediate die, contact surfaces between said intermediate die and said lower die having a surface roughness that permits discharge of gas enclosed in said shaft forming hole portion through a gap between said intermediate die and said lower die;
   placing a glass material on said shaft forming hole portion of said intermediate die and aligning a center axis of said glass material with a center axis of said shaft forming hole portion; and
   subsequently performing press molding for said glass material.

3. A molding process according to claim 1, wherein said shaft forming hole portion of said intermediate die is chamfered at least on a side on which said glass material is placed.

4. A molding process according to claim 1, wherein a mass weight of a spherical glass material is set equal to a mass weight of a product to be molded, a dimension of said shaft forming hole portion of said intermediate die is set equal to the shaft shaped portion of the product to be molded, and a dimension of a height restricting member is determined so that a clearance between said intermediate die and said upper die becomes equal to a dimension of the product to be molded.

5. A molding process of a plurality of disks, each disk having a shaft shaped portion comprising the steps of:
   providing a press die having an upper die performing press molding from an upper surface, an intermediate die having a plurality of shaft forming hole portions each for forming a shaft shaped portion, and a lower die for forming a lower surface of said shaft shaped portion, said lower die being separate from said intermediate die;
   placing a glass material of revolving body shape having a circular cross-section in a direction perpendicular to its center axis on each of said shaft forming hole portions of said intermediate die of said press die respectively; and
   subsequently performing press molding for each said glass material for producing said plurality of disks each having a shaft shaped portion with sufficient concentricity.

6. A molding process of a plurality of disks, each disk having a shaft shaped portion comprising the steps of:
   providing a press die having an upper die performing press molding from an upper surface, a plurality of intermediate dies each having a shaft forming hole portion for forming a shaft shaped portion, and a lower die for forming a lower surface of each said shaft shaped portion, said lower die being separate from said intermediate dies, contact surfaces between said intermediate die and said lower die having a surface roughness that permits discharge of gas enclosed in said shaft forming hole portion through a gap between said intermediate die and said lower die;

placing a glass material of revolving body shape having a circular cross-section in a direction perpendicular to its center axis on each said shaft forming hole portion of said intermediate dies of said press die respectively; and subsequently performing press molding for each said glass material for simultaneously producing said plurality of disks each having a shaft shaped portion with sufficient concentricity between each of said plurality of disks and corresponding shaft shaped portion.

* * * * *